United States Patent
Johnson et al.

(10) Patent No.: US 7,072,553 B2
(45) Date of Patent: *Jul. 4, 2006

(54) LOW-LOSS PHOTONIC CRYSTAL WAVEGUIDE HAVING LARGE CORE RADIUS

(75) Inventors: Steven G. Johnson, Cambridge, MA (US); Mihai Ibanescu, Cambridge, MA (US); Ori Weisberg, Cambridge, MA (US); Yoel Fink, Cambridge, MA (US); John D. Joannopoulos, Belmont, MA (US); Maksim Skorobogatiy, Brighton, MA (US); Torkel Engeness, Somerville, MA (US); Marin Soljacic, Somerville, MA (US); Steven A. Jacobs, Needham, MA (US)

(73) Assignee: OmniGuide Communications, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/620,479

(22) Filed: Jul. 16, 2003

(65) Prior Publication Data

US 2004/0013379 A1    Jan. 22, 2004

Related U.S. Application Data

(63) Continuation of application No. 10/057,258, filed on Jan. 25, 2002, now Pat. No. 6,625,364.

(60) Provisional application No. 60/337,603, filed on Nov. 8, 2001, provisional application No. 60/264,201, filed on Jan. 25, 2001.

(51) Int. Cl.
    G02B 6/036    (2006.01)
    G02B 6/02     (2006.01)
(52) U.S. Cl. ..................... 385/127; 385/123

(58) Field of Classification Search ........ 385/123–128, 385/141–145
See application file for complete search history.

(56) References Cited

U.S. PATENT DOCUMENTS

| 4,852,968 A | 8/1989 | Reed |
| 5,185,827 A | 2/1993 | Poole |
| 5,261,016 A | 11/1993 | Poole |
| 5,448,674 A | 9/1995 | Vengsarkar et al. |
| 5,641,956 A | 6/1997 | Vengsarkar et al. |

(Continued)

FOREIGN PATENT DOCUMENTS

EP    0 060 085    9/1982

(Continued)

OTHER PUBLICATIONS

A. G. Bulushev et al. "Spectrally selective mode conversion at in homogeneities of optical fibers," Sov. Tech. Phys. Lett., 14, 506-507 (1988).

(Continued)

Primary Examiner—Michelle Connelly-Cushwa
(74) Attorney, Agent, or Firm—Fish & Richardson P.C.

(57) ABSTRACT

An optical waveguide including: a dielectric core region extending along a waveguide axis; and a dielectric confinement region surrounding the core about the waveguide axis, the confinement region comprising a photonic crystal structure having a photonic band gap, wherein during operation the confinement region guides EM radiation in at least a first range of frequencies to propagate along the waveguide axis, wherein the core has an average refractive index smaller than about 1.3 for a frequency in the first range of frequencies, and wherein the core a diameter in a range between about $4\lambda$ and $80\lambda$, wherein $\lambda$ is a wavelength corresponding to a central frequency in the first frequency range.

22 Claims, 10 Drawing Sheets

U.S. PATENT DOCUMENTS

| | | | |
|---|---|---|---|
| 5,661,839 | A | 8/1997 | Whitehead |
| 5,814,367 | A | 9/1998 | Hubbard et al. |
| 5,882,774 | A | 3/1999 | Jonza et al. |
| 5,894,537 | A | 4/1999 | Berkey et al. |
| 5,995,696 | A | 11/1999 | Miyagi et al. |
| 6,043,914 | A | 3/2000 | Cook et al. |
| 6,044,191 | A | 3/2000 | Berkey et al. |
| 6,154,318 | A | 11/2000 | Austin et al. |
| 6,175,671 | B1 | 1/2001 | Roberts |
| 6,301,421 | B1 | 10/2001 | Wickham et al. |
| 6,334,017 | B1 | 12/2001 | West |
| 6,334,019 | B1 | 12/2001 | Birks et al. |
| 6,380,551 | B1 | 4/2002 | Abe et al. |
| 6,389,197 | B1 | 5/2002 | Iltchenko et al. |
| 6,404,966 | B1 | 6/2002 | Kawanishi et al. |
| 6,453,097 | B1 * | 9/2002 | Newton et al. ............ 385/102 |
| 6,463,200 | B1 * | 10/2002 | Fink et al. ................. 385/123 |
| 6,487,359 | B1 * | 11/2002 | Bruns ........................ 385/147 |
| 6,625,364 | B1 * | 9/2003 | Johnson et al. ............ 385/127 |
| 6,874,950 | B1 * | 4/2005 | Colgan et al. ............... 385/88 |
| 6,895,132 | B1 * | 5/2005 | Moslehi et al. ............... 385/13 |
| 2001/0026667 | A1 | 10/2001 | Kawanishi et al. |
| 2002/0039046 | A1 | 4/2002 | Lipson et al. |

FOREIGN PATENT DOCUMENTS

| | | |
|---|---|---|
| EP | 0 195 630 | 9/1986 |
| EP | 0 426 203 | 5/1991 |
| GB | 2288469 | 10/1995 |
| JP | 2000-035521 | 2/2000 |
| JP | 2000035521 A * | 2/2000 |
| JP | 2001-051244 | 2/2001 |
| WO | WO 94/09393 | 4/1994 |
| WO | WO 94/16345 | 7/1994 |
| WO | WO 97/01774 | 1/1997 |
| WO | WO 99/47465 | 9/1999 |
| WO | WO 99/49340 | 9/1999 |
| WO | WO 99/49341 | 9/1999 |
| WO | WO 00/22466 | 4/2000 |
| WO | WO 00/51268 | 8/2000 |
| WO | WO 00/51269 | 8/2000 |
| WO | WO 00/77549 | 12/2000 |
| WO | WO 01/69295 | 9/2001 |

OTHER PUBLICATIONS

A. N. Lazarchik, "Bragg fiber lightguides," Radiotekhnika i electronika, 1, 36-43 (1988).
C. M. de Sterke et al., "Differential losses in Bragg fibers," J. Appl. Phys., 76, 680-688 (1994).
C. Moeller, "Mode converters in the Doublet III ECH microwave system," Int. J. Electronics, 53, 587-593 (1982).
D. Marcuse et al., "Mode conversion caused by diameter changes of a round dielectric waveguide," Bell Syst. Tech. J., 48, 3217-3232 (1969).
D. Marcuse, "Theory of dielectric optical waveguides," (Academic, New York, 1974).
E. Luneville et al., "An original approach to mode converter optimum design," IEEE Trans. Microwave Theory Tech., 46, (1998).
E. Mao et al., "Wavelength-selective semiconductor in-line fibre photodetectors," Electronics Letters, vol. 36, No. 6, pp. 515-516, Mar. 16, 2000.
E. Marcatili et al., "Hollow metallic and dielectric waveguides for long distance optical transmission and lasers," Bell Syst. Tech. J., 43, 1783-1809 (1964).
E. Peral et al., "Supermodes of grating-coupled multimode waveguides and application to mode conversion between copropagating modes mediated by backward Bragg scattering," J. Lightwave Tech., 17, 942-947 (1999).

F. Brechet et al. "Analysis of bandpass filtering behavior of singlemode depressed-core-index photonic bandgap fibre," Elec. Lett., 36, 870-872 (2000).
F. Brechet et al., "Singlemode propagation into depressed-core-index photonic-bandgap fibre designed for zero-dispersion propagation at short wavelengths," Elec. Lett., 36, 514-515 (2000).
G. H. Childs, "50mm diameter $TE_{01}$ mode helical waveguide optimization," Electronics Lett., 14, 140-141 (1978).
H. F. Taylor, "Bending effects in optical fibers," J. Lightwave Tech., 2, 617-628 (1984).
H. Kumric et al., "Optimized overmoded $TE_{01}$-to-$TM_{11}$ mode converters for high-power millimeter wave applications at 70 and 140 GHz," Int. J. Infrared Millim. Waves, 7, 1439-1463 (1986).
H. Kumric et al., "Optimization of mode converters for generating the fundamental $TE_{01}$ mode from $TE_{06}$ gyrotron output at 140 GHz," Int. J. Electron, 64, 77-94 (1988).
H.Yajima, "Dielectric bypass waveguide mode order converter," IEEE J. Quantum Electronics, 15, 482-487 (1979).
I. Gannot, et al., "Current Status of Fexible Waveguides for IR Laser Radiation Transmission", IEEE J. Sel. Topics in Quantum Electr., IEEE Service Center, vol. 2, No. 4, pp. 880-888 (Dec. 1996); XP000694378.
I. K. Hwang et al., "Long-period fiber gratings based on periodic microbends," Opt. Lett., 24, 1263-1264 (1999).
I. Ogawa et al., "Design of a quasi-optical mode conversion system with variable output beam size," Int. J. Electron., 87, 457-467 (2000).
J. A. Harrington, "A review of IR transmitting, hollow waveguides", Fiber Integr. Opt. 19, 211-227 (2000).
J.C. Knight et al., "Photonic band gap guidance in optical fibers" Science 282, 1476-1478 (1998).
J.J. Refi, "Optical fibers for optical networking," Bell Labs Technical Journal, 4,246-261 (1999).
J. N. Blake et al., "Fiber-optic modal coupler using periodic microbending," Opt;. Lett., 11, 177-179 (1986).
J. S. Levine, "Rippled wall mode converters for circular waveguide," Int. J. Infrared Milim. Waves, 5, 937-952 (1984).
J.L. Auguste et al., "-1800ps/(nm-km) chromatic dispersion at 1.55µm in dual concentric core fibre", Elec. Lett., Sep. 28th 2000, vol. 36, No. 20.
J.W. Hahn et al., "Measurement of nonresonant third-order susceptibilities of various gases by the nonlinear interferometric technique," J. Opt. Soc. Am. B, 12, 1021-1027 (1995).
K. J. Bunch et al., "The helically wrapped circular waveguide," IEE Trans. Electron Devices, 34, 1873-1884 (1987).
K. O. Hill et al., "Efficient mode conversion in telecommunication fiber using externally written gratings," Electron. Lett., 26, 1270-1272 (1990).
L. Dong et al., "Intermodal coupling by periodic microbending in dual-core fibers—comparison of experiment and theory," J. Lightwave Tech., 12, 24-27 (1994).
L. Gruner-Nielson et al., "Dispersion compensating fibers," Optical Fiber Tech., 6, 164-180 (2000).
L. M. Field, "Some slow-wave structures for traveling-wave tubes," Proc. IRE, 37, 34-40 (1949).
Lars Gruner-Nielson et al., "New dispersion compensating fiberes for simultaneous compensation of dispersion and dispersion slope of non-zero dispersion shifted fibres in the C or L band", OFC '00.

M. Ibanescu et al., "An all-dielectric coaxial waveguide," Science, 289, 415-419 (2000).

M. J. Buckley et al., "A single period $TE_{02}$-$TE_{01}$ mode converter in a highly overmoded circular waveguide," IEEE Trans. Microwave Theory Tech., 39, 1301-1306 (1991).

M. J. Weber et al., "Measurements of the electronic and nuclear contributions to the nonlinear refractive index of beryllium fluoride glasses," Appl. Phys. Lett., 32, 403-405 (1978).

M. Miyagi, et al., "Transmission characteristics of dielectric-coated metallic waveguides for infrared transmission: slab waveguide model", IEEE J. Quantum Elec. QE-19, 136-145 (1983).

M. Miyagi, et al., "Wave propagation and attenuation in the general class of circular hollow waveguides with uniform curvature", IEEE Trans. Microwave Theory Tech. MTT-32, 513-521 (1984).

M. Otsuka et al., "Development of mode converters for 28 GHz electron cyclotron heating system," Int. J. Electron, 70, 989-1004 (1991).

M. Thumm, "High power millimeter-wave mode converters in overmoded circular waveguides using periodic wall perturbations," Int. J. Electron., 57, 1225-1246 (1984).

Mitsunobu Miyagi et al., "Design theory of dielectric-coated circular metallic waveguides for infrared transmission," J. Lightwave Tech., vol. LT-2, 116-126, Apr. 1984.

N. J. Doran et al., "Cylindrical Bragg fibers: a design and feasibility study for optical communications," J. Lightwave Tech., 1, 588-590 (1983).

Pochi Yeh et al., "Theory of Bragg fiber," J. Opt. Soc. Am., vol. 68, 1196-1201 Sep. 9, 1978.

R. F. Cregan et al., "Single-mode photonic band gap guidance of light in air," Science, 285, 1537-1539 (1999).

R.A. Abram et al., "Mode conversion in an imperfect waveguide," J. Phys. A, 6, 1693-1708 (1973).

S. Ahn et al., "Analysis of helical waveguide," IEEE Trans. Electron Devices, 33, 1348-1355 (1986).

S. H. Yun et al., "All-fiber tunable filter and laser based on two-mode fiber," Opt. Lett., 21, 27-29 (1996).

S.P. Morgan, "Theory of curved circular waveguide containing an inhomogeneous dielectric," Bell Syst. Tech. J., 36, 1209-1251 (1957).

T. Cardinal et al., "Nonlinear optical properties of chalcogenide glasses in the system As-S-Se," J. Non-Cryst. Solids, 256, 353-360 (1999).

T. Iyama et al., Propagation characteristics of a dielectric-coated coaxial helical waveguide in a lossy medium, IEEE Trans. Microwave Theory Tech., 45, 557-559 (1997).

T. Kawanishi et al., "Coaxial periodic optical waveguide," Optics Express, 7, 10-22 (2000).

T. Liang et al., "Mode conversion of ultrafast pulses by grating structures in layered dielectric waveguides," J. Lightwave Tech., 15, 1966-1973 (1997).

T.M. Monro et al., "Holey Optical Fibers: An efficient modal model," IEEE J. Lightwave Technol., 17, 1093-1102 (1999).

T. ul Hag et al., "Optimized irregular structures for spatial- and temporal-field transformation," IEEE Trans. Microwave Theory Tech., 46, 1856-1867 (1998).

W. Lawson et al., "The design of serpentine-mode converters for high-power microwave applications," IEEE Trans. Microwave Theory Tech., 48, 809-814 (May 2000).

Y. Fink et al., "A dielectric omnidirectional reflector," Science, 282, 1679-1682 (1998).

Y. Fink et al., "Guiding optical light in air using an all-dielectric structure," J. Lightwave Tech., 17, 2039-2041 (1999).

Y. W. Li et al., "Triple-clad single-mode fibers for dispersion shifting," IEEE J. Lightwave Technol., 11, 1812-1819 (1993).

Y. Xu et al., "Asymptotic analysis of Bragg fibers and dielectric coaxial fibers," In Proc. SPIE, A. Dutta, A. A. S. Awwal, N. K. Duttta, and K. Okamoto eds., 4532, 191-205 (2001).

Yong Xu et al., "Asymptotic analysis of Bragg fibers," Optics Lett., vol. 25, No. 24, pp. 1756-1758 Dec. 15, 2000.

* cited by examiner

DIELECTRIC WAVEGUIDE HOLLOW METALLIC WAVEGUIDE

LOW-LOSS PHOTONIC CRYSTAL WAVEGUIDE HAVING LARGE CORE RADIUS

CROSS-REFERENCE TO RELATED APPLICATIONS

This application is a continuation of U.S. patent application Ser. No. 10/057,258, filed Jan. 25, 2002, now U.S. Pat. No. 6,625,364 which in turn claims priority to U.S. provisional patent applications 60/264,201 filed Jan. 25, 2001 and 60/337,603 filed November 8, 2001, the contents of which are incorporated herein by reference.

BACKGROUND

This invention relates to the field of dielectric optical waveguides and optical telecommunications.

Optical waveguides guide optical signals to propagate along a preferred path or paths. Accordingly, they can be used to carry optical signal information between different locations and thus they form the basis of optical telecommunication networks. The most prevalent type of optical waveguide is an optical fiber based on index guiding. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts of up to about 2–3% for wavelengths in the range of 1.5 microns.

Signals traveling down an optical fiber slowly attenuate, necessitating periodic amplification and/or regeneration, typically every 50–100 km. Such amplifiers are costly, and are especially inconvenient in submarine cables where space, power sources, and maintenance are problematic. Losses for silica-based optical fibers have been driven down to about 0.2 dB/km, at which point they become limited by the Rayleigh scattering processes. Rayleigh scattering results from microscopic interactions of the light with the medium at a molecular scale and is proportional to $\omega^4 \rho$, where $\omega$ is the light frequency and $\rho$ is the material density, along with some other constants of the material.

In addition to loss, signals propagating along an optical fiber may also undergo nonlinear interactions. In an ideal linear material, light does not interact with itself-this is what allows a fiber to carry multiple communications channels simultaneously in separate wavelengths (wavelength-division multiplexing, or WDM), without interactions or crosstalk. Any real optical medium (even vacuum), however, possesses some nonlinear properties. Although the nonlinearities of silica and other common materials are weak, they become significant when light is propagated over long distances (hundreds or thousands of kilometers) or with high powers. Such nonlinear properties have many undesirable effects including: self/cross phase modulation (SPM/XPM), which can cause increased pulse broadening and limit bitrates; and afour-wave mixing (FWM) and stimulated Raman/Brillouin scattering (SRS/SBS), which induce crosstalk between different wavelength channels and can limit the number of achievable channels for WDM. Such nonlinearities are a physical property of the material in the waveguide and typically scale with the density of the waveguide core.

Typically, optical fibers used for long-distance communications have a core small enough to support only one fundamental mode in a desired frequency range, and therefore called "single-mode" fibers. Single mode operation is necessary to limit signal degradation caused by modal dispersion, which occurs when a signal can couple to multiple guided modes having different speeds. Nonetheless, the name "single-mode" fiber is something of a misnomer. Actually, single-mode fibers support two optical modes, consisting of the two orthogonal polarizations of light in the fiber. The existence and similarity of these two modes is the source of a problem known as polarization-mode dispersion (PMD). An ideal fiber would possess perfect rotational symmetry about its axis, in which case the two modes would behave identically (they are "degenerate") and cause no difficulties. In practice, however, real fibers have some acircularity when they are manufactured, and in addition there are environmental stresses that break the symmetry. This has two effects, both of which occur in a random and unpredictable fashion along the fiber: first, the polarization of light rotates as it propagates down the fiber; and second, the two polarizations travel at different speeds. Thus, any transmitted signal will consist of randomly varying polarizations which travel at randomly varying speeds, resulting in PMD: pulses spread out over time, and will eventually overlap unless bit rate and/or distance is limited. There are also other deleterious effects, such as polarization-dependent loss. Although there are other guided modes that have full circular symmetry, and thus are truly "singlet" modes, such modes are not the fundamental modes and are only possible with a core large enough to support multiple modes. In conventional optical fibers, however, the PMD effects associated with the fundamental mode of a small core supporting only a "single-mode" are far preferable to the effects of modal dispersion in a larger core multi-mode fiber.

Another problem with directing optical signals along an optical waveguide is the presence of chromatic or group-velocity dispersion in that waveguide. Such dispersion is a measure of the degree to which different frequencies of the guided radiation propagate at different speeds (i.e., group velocities) along the waveguide axis. Because any optical pulse includes a range of frequencies, dispersion causes an optical pulse to spread in time as its different frequency components travel at different speeds. With such spreading, neighboring pulses or "bits" in an optical signal may begin to overlap and thereby degrade signal detection. Thus, absent compensation, dispersion over an optical transmission length places an upper limit on the bit-rate or bandwidth of an optical signal.

Chromatic dispersion includes two contributions: material dispersion and waveguide dispersion. Material dispersion comes from the frequency-dependence of the refractive index of the material constituents of the optical waveguide. Waveguide dispersion comes from frequency-dependent changes in the spatial distribution of a guided mode. As the spatial distribution of a guided modes changes, it sample different regions of the waveguide, and therefore "sees" a change in the average index of the waveguide that effectively changes its group velocity. In conventional silica optical fibers, material dispersion and waveguide dispersion cancel each other out at approximately 1310 nm producing a point of zero dispersion. Silica optical fibers have also been modified to move the zero dispersion point to around 1550 nm, which corresponds to a minimum in material absorption for silica.

Unfortunately, while operating at zero dispersion minimizes pulse spreading, it also enhances nonlinear interactions in the optical fiber such as four wave mixing (FWM) because different frequencies remain phase-matched over large distances. This is particularly problematic in wavelength-division multiplexing (WDM) systems where multiple signals are carried at different wavelengths in a common optical fiber. In such WDM systems, FWM introduces cross talk between the different wavelength channels as described above. To address this problem, WDM systems transmit signals through optical fibers that introduce a sufficient dispersion to minimize cross-phase modulation, and thereafter transmits the signals through a "dispersion compensating fiber" (DCF), to cancel the original dispersion and minimize pulse spreading in the compensated signal. Unfortunately, aggregate interactions between the dispersion and other nonlinear processes such as self-phase modulation can complicate dispersion compensation.

Another type of waveguide fiber, one that is not based on TIR index-guiding, is a Bragg fiber, which includes multiple dielectric layers surrounding a core about a waveguide axis. The multiple layers form a cylindrical mirror that confines light to the core over a range of frequencies. The multiple layers form what is known as a photonic crystal, and the Bragg fiber is an example of a photonic crystal fiber. Some researchers have commented that Bragg fibers are not feasible for long distance optical transmission (see N. J. Doran and K. J. Blow, J. of Lightwave Tech., LT-1:588, 1983).

SUMMARY

The invention features a photonic crystal fiber having properties particularly suitable for use in optical transmission. In particular, the photonic crystal fibers described herein have low losses, exhibit small nonlinear effects, and can effectively operate in a non-degenerate single mode.

The inventors have recognized that designing a photonic crystal fiber (such as a Bragg fiber) with a large core radius (e.g., larger than about twice the wavelength of the guided radiation) leads to many desirable properties. For example, the inventors have determined that the fraction of energy outside of the core for a guided mode in a photonic crystal fiber scales inversely with the cube of the core radius. Accordingly, radiation and dissipation losses associated with the dielectric confinement layers can be made very small by increasing the core radius. Moreover, because the confinement mechanism is not based on total internal reflection (TIR), the core material is not limited to a material having a relatively high index. Thus, the core material can be selected to minimize losses and nonlinearities. For example, the fiber may have a hollow core. Furthermore, the inventors have discovered that confinement in the core is further improved by selecting materials for the layers (or regions) outside the core to have a large contrast in refractive index. Such contrasts are possible because the large core radius makes dissipation by the outside layers (or regions) less of an issue and thus the constituent materials of the outside layers (or regions) can be selected more on the basis of providing the desired index contrast, than on absorption losses.

The inventors have further recognized that although the large core leads to multiple guided modes, the multiple modes have attenuation losses that differ significantly from one another. The differential losses among the multiple modes (i.e., modal filtering) rapidly lead to single-mode operation for modest transmission lengths, and thus modal dispersion is avoided. Moreover, the lowest-loss mode can be selected to be non-degenerate, which eliminates effects such as polarization-mode dispersion. Nonetheless, the inventors have also recognized that there is an upper limit on the core size. When the core size is too large (e.g., larger than about forty times the wavelength of the guided radiation), the modes become closely spaced, and thus perturbations more easily cause coupling between different modes. Also, the inventors have recognized that in Bragg fibers, the $TE_{01}$ mode has a node near the core/cladding interface, which leads to a reduction in losses and nonlinear effects.

We will now summarize different aspects, features, and advantages of the invention.

In general, in one aspect, the invention features an optical waveguide including: (i) a dielectric core region extending along a waveguide axis; and (ii) a dielectric confinement region surrounding the core about the waveguide axis, the confinement region including a photonic crystal structure having a photonic band gap, wherein during operation the confinement region guides EM radiation in at least a first range of frequencies to propagate along the waveguide axis. The core has an average refractive index smaller than about 1.3 for a frequency in the first range of frequencies, the core has a diameter in a range between about $4\lambda$ and $80\lambda$, wherein $\lambda$ is a wavelength corresponding to a central frequency in the first frequency range, and the dielectric confinement region extends transversely from the core for at least a distance of about $6\lambda$.

In general, in another aspect, the invention features an optical waveguide including: (i) a dielectric core region extending along a waveguide axis; and (ii) a dielectric confinement region surrounding the core about the waveguide axis. The confinement region has an average index greater than that of the core, and during operation the confinement region guides EM radiation in at least a first range of frequencies to propagate along the waveguide axis. The core has an average refractive index smaller than about 1.3 for a frequency in the first range of frequencies, the core has a diameter in a range between about $4\lambda$ and $80\lambda$, wherein $\lambda$ is a wavelength corresponding to a central frequency in the first frequency range, and the dielectric confinement region extends transversely from the core for at least a distance of about $6\lambda$.

In general, in another aspect, the invention features an optical waveguide including: (i) a dielectric core region extending along a waveguide axis; and (ii) a dielectric confinement region surrounding the core about the waveguide axis. The confinement region includes alternating layers of at least two dielectric two materials surrounding the core about the waveguide axis, the two dielectric materials having refractive indices that differ by at least 10%, and wherein during operation the confinement region guides EM radiation in at least a first range of frequencies to propagate along the waveguide axis. The core has an average refractive index smaller than about 1.3 for a frequency in the first range of frequencies, the core has a diameter in a range between about $4\lambda$ and $80\lambda$, wherein $\lambda$ is a wavelength corresponding to a central frequency in the first frequency range, and the dielectric confinement region extends transversely from the core for at least a distance of about $6\lambda$.

In general, in another aspect, the invention features an optical waveguide including: (i) a dielectric core region extending along a waveguide axis; and (ii) a dielectric confinement region surrounding the core about the waveguide axis. The confinement region includes at least 12 pairs of alternating layers of dielectric material having different refractive indices, wherein the layers are sufficient to guide EM radiation in at least a first range of frequencies to propagate along the waveguide axis. The refractive indices of the alternating layers differ by at least 10% for a frequency in the first range of frequencies. At least some of the pairs of alternating layers have a total thickness equal to about a, and the core has a diameter in a range between about 10a and 100a. In some embodiments, the core diameter is in a range between 20a and 80a.

In another aspect, the invention features an optical waveguide including: (i) a dielectric core region extending along a waveguide axis; and (ii) a dielectric confinement region surrounding the core about the waveguide axis. The confinement region guides EM radiation in at least a first range of frequencies to propagate along the waveguide axis. The core has an average refractive index smaller than about 1.3 for a frequency in the first range of frequencies, and the core has a diamater in a range between about 5 microns and 170 microns.

In general, in another aspect, the invention features an optical waveguide including: (i) a dielectric core region extending along a waveguide axis; and (ii) a dielectric confinement region surrounding the core about the waveguide axis. The confinement region includes at least two dielectric materials forming a photonic crystal structure having a photonic band gap, the dielectric materials sufficient to guide EM radiation in at least a first range of frequencies to propagate along the waveguide axis. The refractive indices of the dielectric materials in the confinement region differ by at least 10% for a frequency in the first range of frequencies, and the core has a diameter in a range between about 5 microns and 170 microns.

Embodiments of any of the waveguides described above may include any of the following features.

The dielectric confinement region may extend transversely from the core for at least a distance of about 8λ, about 10λ, or about 12λ. The average refractive index of the core may smaller than about 1.3, smaller than about 1.2, or smaller than about 1.1 for a frequency in the first range of frequencies. The core may include a gas.

The diameter of the core may be in a range have a lower limit of any of 4λ, 6λ, 8λ, or 10λ and an upper limit of any of 10λ, 80λ, 60λ, or 40λ, wherein λ is a wavelength corresponding to a central frequency in the first range of frequencies.

The diameter of the core may be in a range have a lower limit of any of 5 microns, 7 microns, 10 microns, and 12 microns and an upper limit of any of 170 microns, 120 microns, and 100 microns, and 50 microns.

The first range of frequencies may correspond to wavelengths in the range of about 1.2 microns to 1.7 microns. Alternatively, the first range of frequencies may correspond to wavelengths in the range of about 0.7 microns to 0.9 microns. The ratio of the bandwidth of the first range of frequencies and the central frequency and may be at least about 10%.

The waveguide axis may be substantially straight or it may include one or more bends. The core may have a circular cross-section, a hexagonal cross-section, or a rectangular cross-section.

The confinement region may guide at least one mode to propagate along the waveguide axis with radiative losses less than 0.1 dB/km, or even less than 0.01 dB/km for a frequency in the first range of frequencies. For example, the mode may be a TE mode (e.g., $TE_{01}$). The waveguide may support a mode in which at least 99% of the average energy of the propagating EM radiation is in the core for a frequency in the first range of frequencies.

The confinement region may include at least two dielectric materials having different refractive indices. The ratio of the refractive index of the higher index dielectric material to that of the lower index dielectric material may be greater than 1.1, greater than 1.5, or greater than 2. For example, the lower-index dielectric material may include a polymer or a glass, and the higher-index dielectric material may include germanium, tellurium, or a chalcogenide glass.

The photonic bandgap may be an omnidirectional photonic bandgap. The photonic bandgap may be sufficient to cause EM radiation that is incident on the confinement region from the core in the first frequency range and with any polarization to have a reflectivity for a planar geometry that is greater than 95% for angles of incidence ranging from 0° to at least 80°. The photonic crystal may be or a one-dimensional photonic crystal or a two-dimensional photonic crystal.

The confinement region may include alternating layers of the two dielectric material surrounding the core about the waveguide axis. For example, the refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}},$$

where $d_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively. The confinement region may include at least 12 pairs of the alternating layers. The waveguide may support at least one mode propagating along the waveguide axis for which the confinement region includes a sufficient number of pairs of alternating layers to limit radiative losses of the mode to less than 0.1 dB/km or even less than 0.01 dB/km for a frequency in the first range of frequencies.

At least a first end of the waveguide may include a coupling segment over which the refractive index cross-section is continuously varied to alter the field profile of the working mode. Furthermore, there may be a second waveguide coupled to the first mentioned waveguide, wherein the cross-section of the second waveguide adjacent the first waveguide includes regions of doped silicon located to improve coupling of the working mode into the second waveguide. Alternatively, or in addition, the cross-section of the second waveguide adjacent the first waveguide may include a hollow ring contacting the dispersion tailoring region of the first waveguide to thereby improve coupling of the working mode into the second waveguide.

In another aspect, the invention features an optical telecommunications system including: (i) a transmitter generating an optical signal; and (ii) any of the optical waveguides described above coupled at one end to the transmitter to carry the optical signal, wherein the optical signal is at a frequency in the first frequency range. The optical waveguide may have a length greater than 30 km, greater than 200 km, or greater than 500 km.

The system may further include an optical receiver coupled to the other end of the optical waveguide to detect the optical signal, an optical amplifier coupled to the other end of the optical waveguide to amplify the optical signal, an optical regenerator coupled to the other end of the optical waveguide to regenerate the optical signal as an electrical signal, and/or a dispersion compensation module coupled to the other end of the optical waveguide to introduce dispersion to the optical signal that substantially cancels dispersion caused by the optical waveguide. The optical signal may be at a wavelength in the range of about 1.2 microns to about 1.7 microns or in the range of about 0.7 microns to about 0.9 microns. Furthermore, the transmitter may generate multiple signals at different wavelengths, and wherein the different wavelengths correspond to frequencies in the first frequency range.

In general, in another aspect, the invention features a method of designing a photonic crystal optical waveguide including a dielectric core region extending along a waveguide axis and a dielectric confinement region surrounding the core about the waveguide axis, wherein the confinement region is configured to guide EM radiation in at least a first range of frequencies to propagate along the waveguide axis and wherein the core has an average refractive index smaller than about 1.3 for a frequency in the first range of frequencies. The method includes selecting a diameter for the core based on one or more design criteria for the guided EM radiation including mode separation, group-velocity dispersion, radiative losses, absorption losses, and cladding nonlinearity suppression. For example, the diameter for the core may be based on at least two of the design criteria. In particular, an upper limit for the diameter of the core may be selected based on the mode separation, and a lower limit for the diameter may be selected based on at least one of the group-velocity dispersion, the radiative losses, the absorption losses, and the cladding nonlinearity suppression. Furthermore, the confinement region may include at least two dielectric materials having different refractive, and the method may further include selecting an index contrast for the different refractive indices based on at least one of the design criteria including the radiative losses, the absorption losses, and the cladding nonlinearity suppression.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Additional features, objects, and advantages of the invention will be apparent from the following detailed description and drawings, and from the claims.

DESCRIPTION OF DRAWINGS

The invention will now be further described merely by way of example with reference to the accompanying drawings in which.

DETAILED DESCRIPTION

The invention features a photonic crystal fiber waveguide 100 having small attenuation rates, exhibiting small nonlinearities, and providing effectively single-mode operation.

Basic Structure

Figure 1:
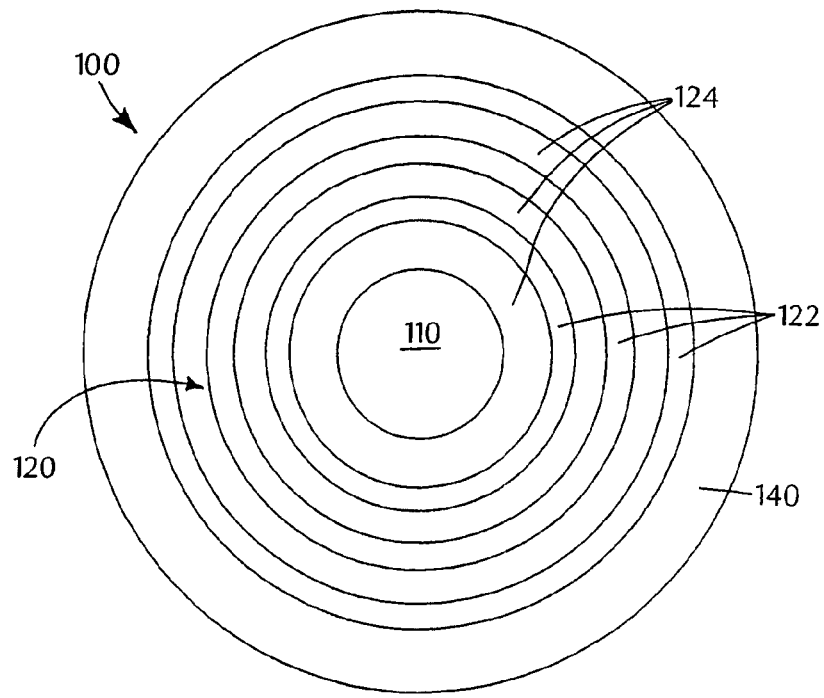
FIG. 1 is a schematic diagram of the cross-section of a photonic crystal waveguide fiber 100.

The cross-section of waveguide 100 is shown in FIG. 1 and includes a dielectric core 110 extending along a waveguide axis and a dielectric confinement region 120 surrounding the core. In the embodiment of FIG. 1, confinement region 120 is shown to include alternating layers 122 and 124 of dielectric materials having different refractive indices. One set of layers, e.g., layers 122, define a high-index set of layers having an index $n_{hi}$ and a thickness $d_{hi}$, and the other set of layers, e.g., layers 124, define a low-index set of layers having an index $n_{lo}$ and a thickness $d_{lo}$, where $n_{hi} > n_{lo}$. For convenience only a few of the dielectric confinement layers are shown in FIG. 1. In practice, confinement region 120 may include many more layers (e.g., twenty or more layers). Waveguide 100 may further include an additional structural cladding layer 140 surrounding the confinement region 120 to provide structural support to the waveguide as a whole. Because structual layer 140 does not contribute substantially to the optical properties (e.g., radiative losses and dispersion) of the waveguide, we do not discuss it further.

To simplify numerical calculations in the sections that follow, we assume a circular cross-section for fiber waveguide 100, with core 110 having a circular cross-section and region 120 (and layers therein) having an annular cross-section. In other embodiments, however, the waveguide and its constituent regions may have different geometric cross-section such as a rectangular or a hexagonal cross-section. Furthermore, as mentioned below, core and confinement regions 110 and 120 may comprise multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 110 and 120, however, is defined by a change in index. The change may be caused by the interface of two different dielectric materials or by different dopant concentrations in the same dielectric material (e.g., different dopant concentrations in silica).

Dielectric confinement region 120 guides EM radiation in a first range of frequencies to propagate in dielectric core 110 along the waveguide axis. The confinement mechanism is based on a photonic crystal structure in region 120 that forms a bandgap including the first range of frequencies. Because the confinement mechanism is not index-guiding, it is not necessary for the core to have a higher index than that of the portion of the confinement region immediately adjacent the core. To the contrary, core 110 may have a lower average index than that of confinement region 120. For example, core 110 may be air or vacuum. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 110 may include a porous dielectric material to provide some structural support for the surrounding confinement region while still defining a core that is largely air. Accordingly, core 110 need not have a uniform index profile.

The alternating layers 122 and 124 of confinement region 120 form what is known as a Bragg fiber. The alternating layers are analogous to the alternating layers of a planar dielectric stack reflector (which is also known as a Bragg mirror). The annular layers of confinement region 120 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of frequencies in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for frequencies both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 220 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega = c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide onmidirectional reflection (in a planar limit) for a cylindrical waveguide geometry is disclosed in Published PCT application WO 00/22466, the contents of which are incorporated herein by reference.

When alternating layers 122 and 124 in confinement region 120 give rise to an omnidirectional bandgap with respect to core 110, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflectivity in a planar geometry of at least 95% for all angles of incidence ranging from 0° to 80° and for all polarizations of EM radiation having frequency in the omnidirectional bandgap. Furthermore, even when waveguide 100 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a onedimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al., Science 285:1537–1539, 1999. Furthermore, even in a Bragg-like configuration, the high-index layers may vary in index and thickness, and/or the low-index layers may vary in index and thickness. In general, the confinement region may be based on any index modulation that creates a photonic bandgap.

The multilayer waveguides may be fabricated using multilayer co-drawing techniques, co-extrusion techniques, or deposition techniques. Suitable high-index materials may include chalcogenide glasses such as binary and ternary glass systems, heavy metal oxide glasses, amorphous alloys, and high-index doped polymers. Suitable low-index materials may include oxide glasses such as borosilicate glasses, halide glasses, and poymers such as polystyrene. In addition, low-index regions may be fabricated by using hollow structural support materials, such as silica spheres or hollow fibers, to separate high-index layers or regions.

In general, computational methods known in the art can be used to determine the modal properties of the dielectric waveguides described herein. Furthermore, iterative calculations may be used to determine waveguide specifications that optimize selected waveguide properties. We outline below some of the basic physics that underlie such calculations. In particular, the EM modes supported by a structure can be solved numerically according to Maxwell's equations and the boundary conditions for the structure. Furthermore, for an all-dielectric, isotropic structure, Maxwell's equations can be reduced to:

$$\nabla \times \left(\frac{1}{\varepsilon(r)} \nabla \times H(r)\right) = \left(\frac{\omega^2}{c^2}\right) H(r) \qquad (1)$$

$$\nabla \cdot H(r) = \nabla \cdot E(r) = 0 \qquad (2)$$

$$E(r) = \left(\frac{-ic}{\omega\varepsilon(r)}\right) \nabla \times H(r), \qquad (3)$$

where H and E are the macroscopic magnetic and electric fields, respectively, and $\in$ is the scalar dielectric constant for the structure. To solve for the EM modes of such a structure, one solves the eigenvalue equation given by Eq. 1 (where H is the eigenfunction and $\omega^2/c^2$ is the eigenvalue) subject to the divergence equation, Eq. 2, to give H. Thereafter, one can determine E from H according to Eq. 3.

Often symmetry can be used to simplify the solution. For example, with respect to many of the particular example described herein, we may assume continuous translational symmetry (i.e., a uniform cross-section) along its longitudinal axis, which we shall denote as the z-axis. Of course, in practice the structures may have small deviations from such uniformity. Moreover, the structures will have a finite spatial extent. Nonetheless, based on the assumption of a uniform cross-section for some length that is large relative to the waveguide diameter, the EM modes supported by the waveguides can be written schematically as $F(x,y,z)=\exp[i(\beta z-\omega t)]F(x,y)$, where F is any of the electromagnetic field components. The parameter $\beta$ in the expression for F is the longitudinal wavevector.

In the following sections we provide a more detailed analysis of photonic crystal fiber waveguide 100 and the parameters that lead to optimal performance for long distance optical telecommunications. The analyses focus on a Bragg fiber arrangement, but the results and scaling laws may be extended to large core photonic crystal fibers in general.

Hollow Dielectric vs. Metallic Waveguides

Figure 2:
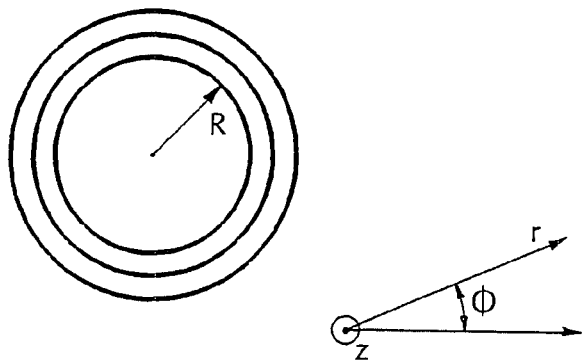
FIG. 2 are schematic diagrams of the cross-sections of a Bragg fiber waveguide (left panel) and a hollow metallic waveguide (right panel).
Figure 2:
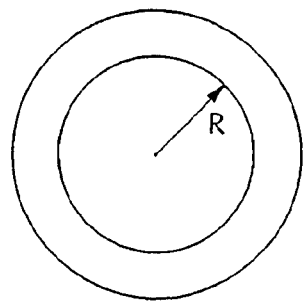

Insight into the principles of dielectric waveguide 100 may be achieved through analogy with a hollow metallic waveguides. FIG. 2 shows a hollow dielectric photonic crystal waveguide 200 having core radius R (left panel) contrasted with a hollow metallic waveguide 210 having a core radius R (right panel). In dielectric waveguide 200, the hollow core (index of refraction unity) is surrounded by a multilayer confinement region (hereinafter "cladding") that includes of alternating layers having high (dark) and low (light) indices of refraction. In the presently described embodiment, the indices of refraction of the cladding layers are selected to be 4.6 and 1.6 and have thicknesses of 0.33a and 0.67a, respectively, where a is the thickness of one high/low bilayer. Once a mode frequency v is computed units of c/a, where c is the speed of light, the physical value of a is determined via a=λ\v for some desired operational wavelength λ. The radius R of the waveguide will vary in the differing examples presented herein, for example, from a minimum of 2a to a maximum of 100a. As we shall see, values of R greater than about 5a (or even greater than 10a or 20a) have many advantages.

Figure 3:
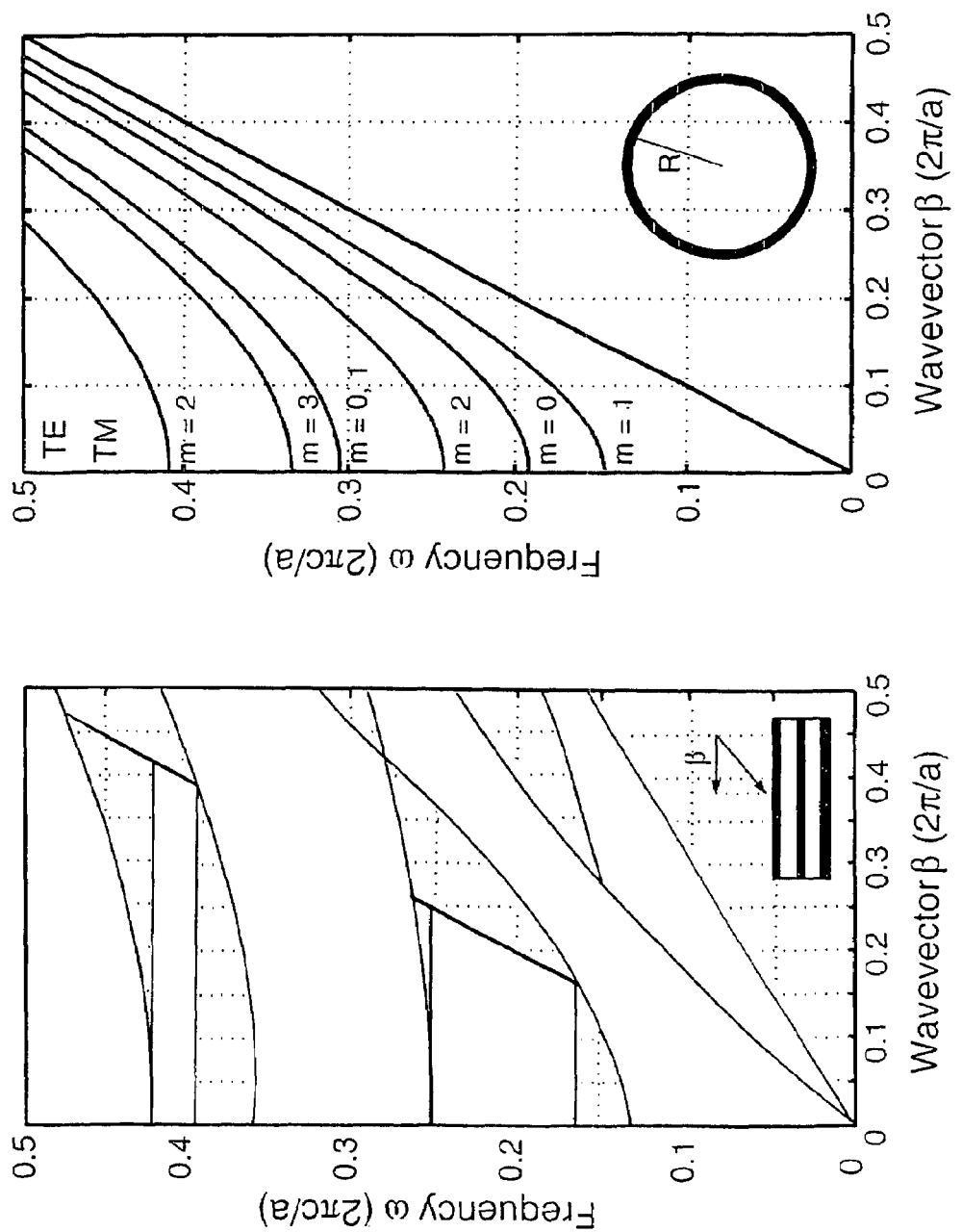
FIG. 3 are photonic band diagrams for a planar Bragg mirror (left panel) and a hollow metallic waveguide (right panel).

Metallic waveguide 210 has as that of hollow dielectric waveguide 200, but a metal cylinder replaces the multilayer dielectric cladding. In the metallic case, light is confined in the core by the impenetrability of a near-perfect metal (something that is practical nonexistent at optical frequencies). The confined modes for metallic waveguide 210 with R=2a are depicted in FIG. 3 (right panel) for the lowest seven modes. The dispersion relations shown in FIG. 3 depict two conserved quantities: the axial wavenumber $\beta$ and the frequency $\omega$. By symmetry, modes of a cylindrical waveguide can also be labeled by their "angular momentum" integer m. For waveguides that lie along the z axis, the $(z,t,\phi)$ dependence of the modes is then given by: $\exp[i(\beta z - \omega t + m\phi)]$, where $\phi$ is the azimuth coordinate for the cylinder. In the hollow metal tube, the eigenmodes are purely polarized as TM ($H_z$=0) or TE ($E_z$=0), and the l-th mode of a given m is labeled $TX_{ml}$.

In the dielectric case, light is confined by the one-dimensional photonic band gap of the multi-layer cladding, which is easy to analyze in the limit as the cladding becomes planar. The resulting band structure is shown in the left panel of FIG. 3. The dark regions in the left panel of FIG. 3 correspond to ($\beta,\omega$) pairs for which light can propagate in the within the mirror, whereas the white and gray regions correspond to situations where light cannot propagate in the mirror. The thick black line in the left panel of FIG. 3 corresponds to the light line ($\omega=c\beta$) and the gray regions correspond to frequency regions of omnidirectional reflectivity for the mirror. For the planar dielectric mirror, $\beta$ is the surface-parallel wavevector component. In the photonic gap regions (the white and gray regions), we expect the mirrors to behave similarly to a metal, and confine modes strongly. Because every eigenmode has a finite, conserved m, the effective wavevector $k_\phi$=m/r in the $\phi$ direction goes to zero as r becomes large. If this were not true, there could be no band gaps in FIG. 3 because non-zero $k_\phi \perp \beta$ would have to be projected on the Bragg band diagram. Notably, the Bragg band diagram shows ranges of omnidirectional reflection (gray regions), which correspond to frequencies at which any incident wave from air are reflected by the planar mirrors (and vice versa). Omnidirectional reflection per se is not strictly necessary for guidance in these fibers, but its presence is strongly correlated with the regimes of large, polarization-independent gaps along the light line.

Bragg mirrors have different band-gaps for "TE" and "TM" polarizations, referring to fields purely parallel to the interface and fields with a normal component, respectively. (Both polarizations are shown in FIG. 3. Strictly speaking, this corresponds to the metallic waveguide TE and TM labels only for m=0; all non-zero m modes have some nonzero $E_r$ component.

The modes supported by any cylindrical waveguide, including metallic waveguides, Bragg fibers, and conventional index-guided fibers, can be computed by a transfer-matrix method in which the longitudinal fields (E{z} and H{z}) of a given (m, ω, β) in an annular region of index $n_j$ are expanded in Bessel functions $J_m(k_j r)$ and $Y_m(k_j r)$, with $k_j \equiv \sqrt{n_j^2 \omega^2/c^2 - \beta^2}$. At each interface, the coefficients are related by a 4×4 transfer matrix that matches boundary conditions. The product of all these transfer matrices yields a single matrix relating the fields in the core to those in the outermost cladding. Then, by application of appropriate boundary conditions, the $\beta_n$ wavevectors of the various modes can be found, as discussed further below.

For the moment, we are primarily interested in the modes that lie within the band gap of the one-dimensional Bragg mirrors. Such modes must decay exponentially with r in the cladding (i.e., confinement region), and therefore are truly guided modes in the limit of infinitely many cladding layers (the case of finite layers is considered further below). Most of these modes lie above the ω=cβ light line, and thus propagate within the hollow core in much the same way as the modes of a metallic waveguide. It is also possible, however, for modes to lie beneath the light line and yet inside the band gap, in which case they are surface states localized around the core/cladding interface.

Figure 4:
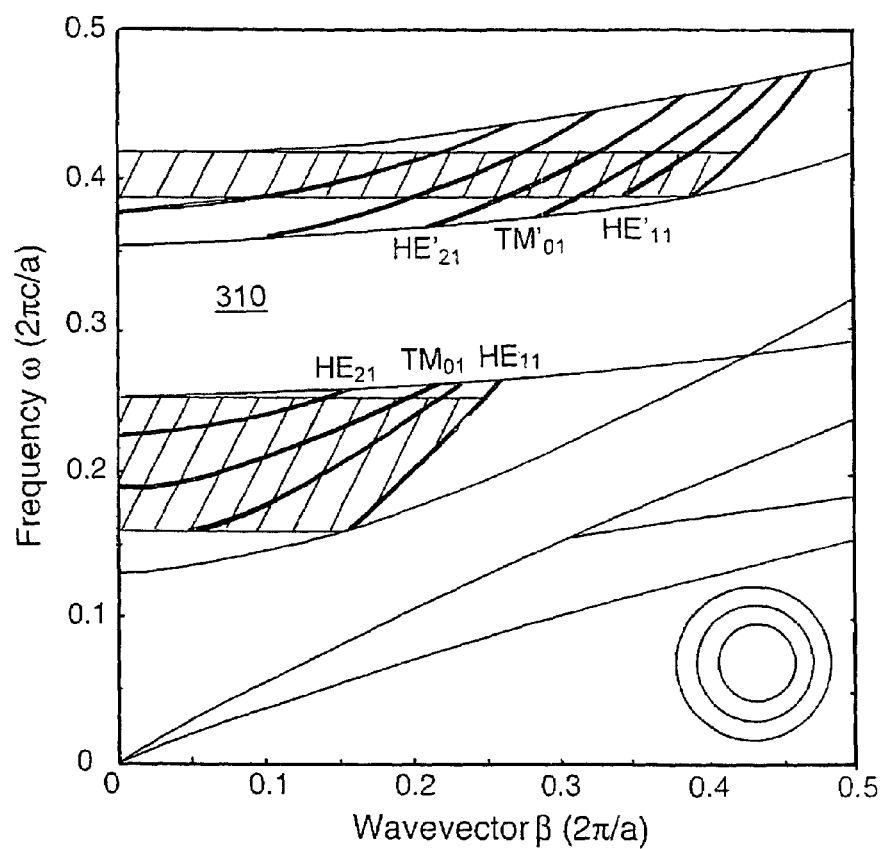
FIG. 4 is a photonic band diagram graph of a Bragg fiber.

In FIG. 4, we show the first couple guided modes computed for a Bragg fiber with core-radius R=2a and the above-mentioned planar-mirror parameters. The light-colored lines in FIG. 4 are for TE and HE modes, while the dark-colored lines are for TM and EH modes, and again the thick black line is the light line (ω=cβ). The dark solid regions in FIG. 4 represent the continuum of modes that propagate within the multilayer cladding. The guided modes are at nearly the same frequencies as those for the guided modes of the metallic waveguide in FIG. 3 (right-panel), with the one-dimensional bandgaps superimposed. In the dielectric waveguide, the modes are only purely TE and TM for m=0, but for non-zero m they are strongly TE-like or TM-like, and are called HE and EH, respectively. Furthermore, when a mode enters the second gap, we add a prime superscript. We also find that the guided modes in the Bragg fiber have the same orthogonality relationships as those of the metallic waveguide and conclude that their respective field patterns must also be nearly identical.

Large Core Bragg Fibers

The above calculations yielded the modes of a Bragg fiber for a radius R=2a. This small radius has the advantage of supporting only a few modes, which are easy to plot and understand in their entirety and even has a single-mode frequency range. The analogy with metallic waveguides, however, indicates that this may not be the most desirable regime for fiber operation.

In metallic waveguides, the lowest-loss mode is $TE_{01}$, and its ohmic losses decrease as $1/R^3$. Moreover, the differential losses between $TE_{01}$, and other modes create a modal-filtering effect that allows these metallic waveguides to operate in an effectively single-mode fashion. On the other hand, for large core radii (high frequencies), losses become dominated by scattering into other closely-spaced modes, especially into the degenerate $TM_{11}$ mode via bends.

Similar results hold for OmniGuide fibers: the lowest-loss mode is $TE_{01}$ and many of its losses fall off as $1/R^3$. Like the metallic waveguides, and unlike conventional index-guided optical fibers with their small material contrasts, we demonstrate a strong modal-filtering effect based on the degree of confinement in the core. Also as before, inter-modal scattering worsens with increasing R.

Based on such considerations, and as demonstrated further below, we find that a core radius in the range of about 5a to 100a (or even 7a to about 70a, or even 10a to about 50a) leads to desirable results. For a central wavelength λ in the middle of the frequencies guided by the waveguide, these range may be approximately expresses as 2λ<R<40λ, with similar sub-ranges.

In the next couple sections, we focus on an embodiment of a Bragg fiber having a hollow core radius of R=30a, and a confinement region having 17 layers. The 17 layers start with a high-index layer of index 4.6 and alternate with a low-index layer of index 1.6. The thicknesses of the high-index and low-index layers are 0.22a and 0.78a, respectively. The point of lowest $TE_{01}$ dissipation losses (which is discussed further below) then lies at a frequency of ω≈0.28·2 πc/a, so if we make this correspond to the standard λ=1.55 microns of telecommunications, we have a=0.434 microns. Equivalently, R=13.02=8.4λ.

In order to choose the layer thicknesses of the confinement layers, we employ an approximate quarter-wave condition. It is well-known that, for normal incidence, a maximum band gap is obtained for a "quarter-wave" stack in which each layer has equal optical thickness λ/4, or equivalently $d_{hi}/d_{lo} = n_{lo}/n_{hi}$, where d and n refer to the thickness and index, respectively, of the high-index and low-index layers. Normal incidence, however, corresponds to β=0, whereas for a cylindrical waveguide the desired modes typically lie near the light line ω=cβ (in the limit of large R, the lowest-order modes are essentially plane waves propagating along z-axis, i.e., the waveguide axis). In this case, the quarter-wave condition becomes:

$$\frac{d_{hi}}{d_{lo}} = \frac{\sqrt{n_{lo}^2 - 1}}{\sqrt{n_{hi}^2 - 1}} \quad (4)$$

Strictly speaking, Equation (4) may not be exactly optimal because the quarter-wave condition is modified by the cylindrical geometry, which may require the optical thickness of each layer to vary smoothly with its radial coordinate. Nonetheless, we find that Eq. (4) provides an excellent guideline for optimizing many desirable properties, especially for core radii larger than the mid-gap wavelength.

Figure 5:
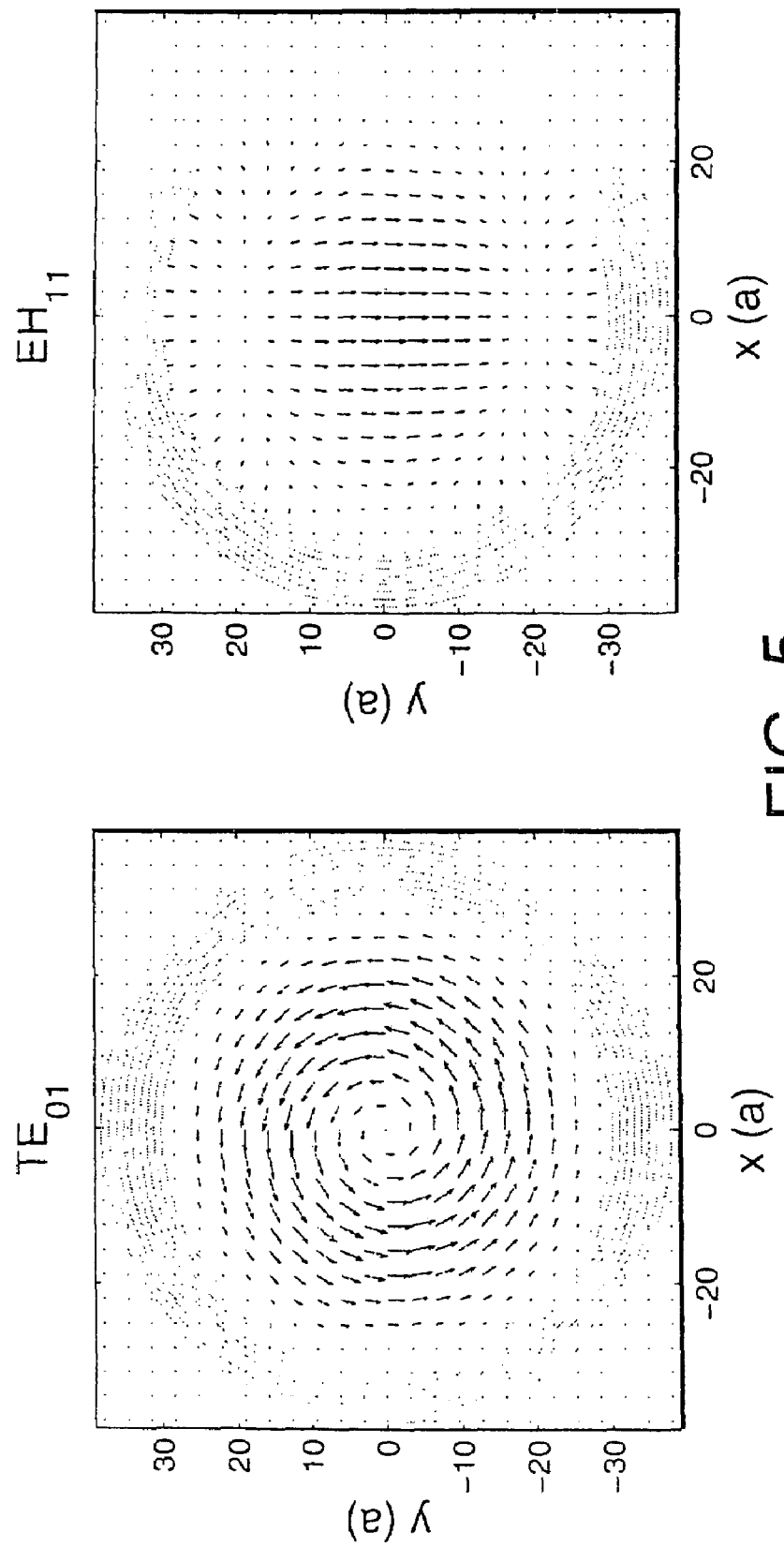
FIG. 5 are plots of the $TE_{01}$ (left panel) and $EH_{11}$ (right panel) field distributions.

As in the R=2a case, the guided-modes of this R=30 a Bragg fiber can be labeled by analogy to the modes of an equal-radius metallic waveguide. Tranverse electric field profiles of two such modes in the Bragg fiber, the lowest-loss $TE_{01}$ and the linearly-polarized $EH_{11}$ (analogous mode to the $TM_{11}$ in a metallic guide) are depicted in FIG. 5 for ω=0.28(2 πc/a) (which corresponds to β=0.27926(2 πc/a) and β=0.27955(2 πc/a) for the two modes, respectively). The $TE_{01}$ mode is circularly symmetric and "azimuthally" polarized ($\vec{E} \perp \hat{\phi}$). Thus, unlike the doubly-degenerate $EH_{11}$ mode (two orthogonal polarizations), cannot be split into two modes of differing velocities by fiber imperfections, and is therefore immune to polarization-mode dispersion (PMD). We note that the mode labeling in a Bragg fiber is more complex than in a metallic waveguide, because sometimes a mode will cross the light line and become a surface state localized around the core/cladding interface. When that happens, another mode moves "up" and takes its place; for example, the $TM_{01}$ mode crosses the light line at $\omega=0.27(2\pi c/a)$, while the $TM_{02}$ mode continuously takes on the core field pattern of $TM_{01}$. When in doubt, we label a mode as HE or EH depending upon whether it is dominated by $H_z$ or $E_z$ at $r=0$, respectively, and number the core modes according to their ordering above the light line.

Scaling Laws with Core Size

Because of the strong reflectivity of the dielectric confinement mirrors, many of the mode properties are determined largely by the geometric size R of the core, within which the modes are confined. Subsequently we derive scaling relations for the different quantities computed, and in this section we lay the groundwork for those derivations by presenting basic scalings of the fields and modes. These scaling relations are largely independent of details such as the precise index contrast that is used, so long as it is sufficiently large for the metallic analogy to hold, and will provide a broad understanding of the advantages and tradeoffs of a Bragg fiber structure.

In particular, we will focus on the suppression of cladding phenomena for the $TE_{01}$ (especially $TE_{01}$) modes of the fiber. A critical property of $TE_{01}$ modes is that, by analogy with a hollow metallic waveguide, they have a node in their electric field near $r=R$. It then follows that the amplitude of the electric field in the cladding is proportional to the slope of $E_\phi$ at R. The form of $E_\phi$ in the core, however, is simply the Bessel function $J_1(\xi r/R)$, where $\xi(\omega)$ is roughly the l-th zero of $J_1$. The slope at R is then $(J_0(\xi)-J_2(\xi))(\xi/2R)$. Moreover, for the quarter-wave stack, the value of $E_\phi$ is maximized at near each of the high-index layer to low-index layer interfaces. Thus, not including any normalization of the $J_1$ amplitude (i.e., $E_\phi \sim 1$), we find that the unnormalized $E_\phi$ in the cladding scales as $d_n/R$. In addition, typically we must normalize the power of the field: this means dividing the electric field vector E by an additional factor proportional to the square root of the mode area, which is proportional to R, and so:

$$\text{normalized } TE_{01} \text{ cladding } \vec{E} \propto \frac{1}{R^2} \quad (5)$$

Moreover, the area of the field in the cladding is the perimeter (which scales as R) times some constant (penetration depth) that depends on the size of the of the band gap. Combining this with Eq. 5 gives:

$$\text{fraction of } \int |\vec{E}|^2 \text{ in cladding for } TE_{01} \propto \frac{1}{R^3} \quad (6)$$

and from this we derive many other scaling relations. In contrast, for TM or mixed-polarization modes with an $E_r$ component, the unnormalized field amplitude in the cladding remains roughly constant with changing R, thus their fractional energy density in the cladding then scales as only 1/R, so the cladding has a much greater effect on them.

By general phase-space arguments, the total number of modes in the core must scale as the area $R^2$. Moreover, in a metal waveguide, the dispersion relations look like $\beta_n = \sqrt{\omega^2/c^2 - \xi_n^2/R^2}$, where $\xi_n$ are roots or extrema of Bessel functions. Therefore, far from cutoff ($R \gg \xi_n c/\omega$), we have:

$$\text{mode separation } \Delta\beta \propto \frac{1}{R^2} \quad (7)$$

Unfortunately, $\Delta\beta$ can be somewhat more complicated in a Bragg fiber, due to the finite field penetration into the cladding and due to the transitions into surface states and subsequent mode relabelings discussed earlier. For example, consider the case of the $EH_{11}$ mode, which is degenerate with $TE_{01}$ in the metallic limit. In the Bragg fiber, however, the degeneracy is broken by the penetration of the fields into the cladding. Such degeneracy breaking can also be understood in terms of the phase shift of a TE/TM polarized wave upon reflection from the dielectric multilayer mirror, which induces a small shift $\Delta\beta$: by perturbation theory, $\Delta\beta$ is proportional to the amount of $EH_{11}$ energy in the cladding, which scales inversely with R:

$$TE_{01} \text{ and } EH_{11} \text{ mode separation } \Delta\beta \propto \frac{1}{R} \quad (8)$$

Testing this scaling relation numerically for $\lambda=1.55$ microns, however, we find that this separation eventually scales as $1/R^2$ for R greater than or equal to about 40a. It turns out that the "fundamental" $HE_{11}$ mode has crossed the light line to become a surface state, and $EH_{11}$ continuously transitions to being more $HE_{11}$-like, thus scaling eventually as Eq. 7.

Leaky Modes and Radiation Loss

In the preceding discussion, we have neglected a point that may seem important: in reality, there will be only a finite number of cladding layers in the confinement region. Because of this, and the fact that the modes of interest lie above the light line of the outermost region, the field power will slowly leak out in a process akin to quantum-mechanical "tunneling." This radiation loss, however, decreases exponentially with the number of cladding layers, and we quantify its smallness explicitly below. We find that only a small number of layers is required to achieve leakage rates well below 0.1 dB/km. Moreover, the radiation leakage strongly differs between modes, inducing a modal-filtering effect that allows a large-core Bragg fiber to operate in an effectively single-mode fashion.

In the limit of infinitely many cladding layers, the modes in the OmniGuide core are true confined modes, thanks to the band gap, with discrete real eigenvalues $\beta_n$. For finitely many layers, modes are no longer truly confined (above the outermost light line), leading to a continuum of $\beta$ values with infinitely-extended eigenstates. The former confined modes become leaky resonances: superpositions of real-$\beta$ eigenmodes centered on $\beta_n$ with a width $\Delta\beta$ proportional to the radiative decay rate $\alpha_n$. Such resonances can be studied directly via the physical real-$\beta$ continuum, but a powerful alternative method is the leaky-mode technique, which employs a conceptual analytic continuation from a real $\beta$ to $\tilde{\beta}$ in the complex plane to satisfy a boundary condition of zero incoming flux. The power decay rate $\alpha_n$ is then given by $2\text{Im}\{\tilde{\beta}_n\}$, where Im denotes the imaginary part.

For the Bragg fiber, the leaky-mode method is as follows. The transfer-matrix formulation allows one to compute 2×2 matrices $M_m^{\pm}(\omega,\beta)$ that connect the TE and TM amplitudes at the origin to the amplitudes of the outgoing (+) or incoming (−) TE and TM cylindrical waves (Hankel functions) in the outermost region, as a function of $\omega$ and $\beta$ for a given angular-momentum index m. For a leaky mode, we wish to impose the boundary condition of zero incoming waves, so that there are no sources at infinity; such a solution exists whenever there is a zero eigenvalue of $M_m^-$. Therefore, we use the determinant:

$$f_m(\omega,\tilde{\beta}) \equiv det[M_m^-(\omega,\tilde{\beta})] \quad (9)$$

so that the leaky mode is defined by $f_m(\omega,\tilde{\beta}_n)=0$. Once $\tilde{\beta}_n$ is found for a given $\omega$, the corresponding eigenvector of $M_m^-(\omega,\tilde{\beta}_n)$ yields the required mixed-polarization amplitudes. With finitely many layers, the only real roots of $f_m$ lie below the light line of the outermost region. (We note that below the light line of the outermost region, the incoming-wave Hankel function instead becomes an exponentially-growing function, but its coefficient must be zero all the same.) Above this light line, the incoming and outgoing flux are equal for real $\beta$, corresponding to steady-state standing-wave patterns. The small imaginary part of $\tilde{\beta}_n$ above the light line yields the power decay rate $\alpha_n = 2\text{Im}\{\tilde{\beta}_n\}$.

Figure 6:
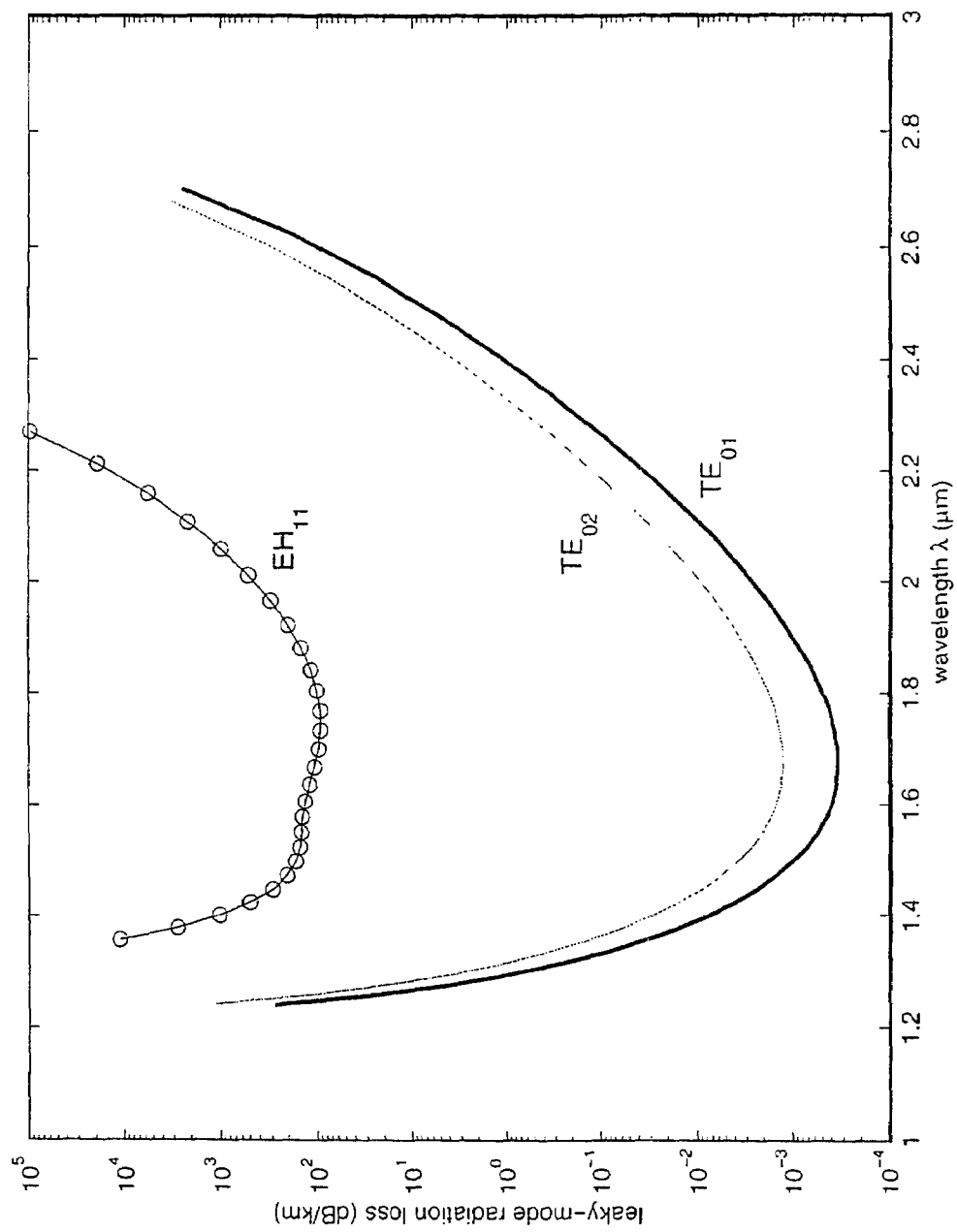
FIG. 6 is a graph of radiation leakage for modes of a large core (R=30a), 17-layer hollow Bragg fiber.

For all modes, the radiative decay $\alpha_n$ decreases exponentially with increasing numbers of cladding layers, thanks to the exponential decay of fields in the Bragg band gap, eventually to the point where other losses (e.g. absorption) dominate. At $\lambda=1.55$ microns for this structure, the TE losses decrease by a factor of about 10 per cladding bilayer and the TM losses decrease by a factor of 5 per cladding bilayer. Because of the smaller TM band gap, the losses of mixed-polarization (non-zero m) modes are eventually dominated by their less-confined TM components. In FIG. 6, we display the computed radiation leakage rates $\alpha_n$ for the 17-layer, R=30 a structure parametrized earlier corresponding to the lowest-loss $TE_{01}$ mode, the next-lowest loss $TE_{02}$ mode, and the linearly-polarized $EH_{11}$ mode to typify mixed-polarization modes. Like the absorption discussed later, these differential losses create a mode-filtering effect that allows the $TE_{01}$ mode to operate as effectively single-mode, even for large-core Bragg fibers. From FIG. 6, it is seen that with only 17 cladding layers the $TE_{01}$ mode has leakage rates well under 0.01 dB/km, and even $EH_{11}$ has decay lengths of meters. Thanks to these low losses, the modes can be treated as truly bound for most analyses (e.g. dispersion relations and perturbation theory), with the leakage rates at most included as an independent loss term.

The radiation losses are proportional to the field amplitude $|\vec{E}|^2$ in the cladding, which goes like $1/R^4$ for $TE_{01}$ from Eq. 5, multiplied by the surface area (which scales as R). Thus:

$$TE_{01}\text{ radiation leakage } \alpha \propto \frac{1}{R^3}, \quad (10)$$

which is the same as the scaling of $TE_{01}$ ohmic losses in a hollow metallic waveguide. In contrast, because of their lack of a node near the boundary, TM and mixed-polarization radiation losses scale only as 1/R.

Group-Velocity Dispersion

Given a dispersion relation $\omega(\beta)$, one important quantity is the group-velocity dispersion D (the rate at which pulses spread), canonically defined as:

$$D \equiv -\frac{\omega^2}{2\pi c}\frac{d^2\beta}{d\omega^2} \quad (11)$$

in units of ps/(nm.km): the pulse-spreading (ps) per km of propagation per nm of $\Delta\lambda$. The dispersion D and the group velocity $v=d\omega/d\beta$ computed exactly from the function $f$ of Eq. 9, which defines the dispersion relation implicitly by $f(\omega,\beta)=0$.

Figure 7:
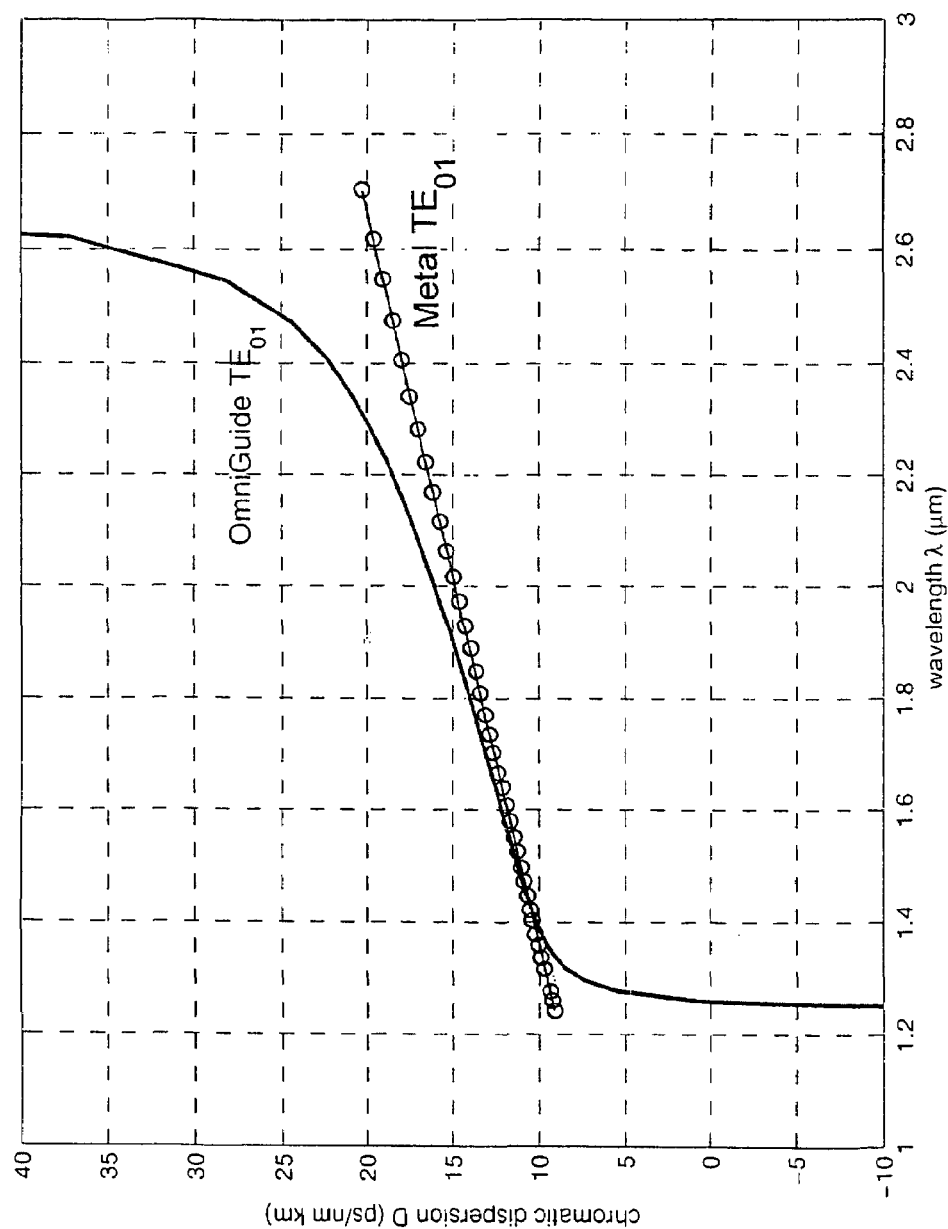
FIG. 7 is a graph of group velocity (chromatic) dispersion for the $TE_{01}$ mode of the large core Bragg fiber.

We can also consider material dispersion (non-zero variations in $n(\omega)$) introduced by the cladding, but we find that this has a negligible effect (due to the small field penetration into the cladding). For example, assuming that the cladding has the same material dispersion as silica at 1.55 microns, the contribution of material dispersion is less than 0.1 ps/(nm.km) over most of the bandwidth. What remains is the waveguide dispersion, which stems from the geometry of the core as well as the variable penetrability of the cladding. The resulting dispersion as a function of wavelength is plotted in FIG. 7 for the $TE_{01}$ mode of the 17-layer Bragg fiber (solid line) and a hollow metallic waveguide of the same radius (lighter line and circles).

As we discuss in the next section, the practical implications of dispersion in a Bragg fiber are quite different than in ordinary fibers, due to the absence of nonlinear effects. Because dispersion no longer interacts with nonlinearities, it can in principle be completely compensated after any distance of propagation, allowing one to put all dispersion compensation at the end of a fiber link, as well as to tolerate higher dispersions. Conversely, operating at or near a point of zero dispersion will no longer exacerbate four-wave mixing noise.

Another important consideration is the relative dispersion slope (RDS), as measured by $(dD/d\lambda)/D$; ideally this quantity is matched in any dispersion-compensation system. For the 17-layer Bragg fiber above, the RDS is around 0.0007 $nm^{-1}$. This is 15 to 30 times smaller than the RDS of contemporary TrueWave-RS™ (0.010 $nm^{-1}$) and LEAF™ (0.021 $nm^{-1}$) fibers, and smaller slopes are typically easier to achieve in dispersion-compensating fibers.

Suppression of Absorption and Nonlinearities

In this section, we compute the effect of absorption losses and nonlinearities in the cladding materials of a Bragg fiber. We show that these effects are strongly suppressed for the $TE_{01}$ mode, allowing highly lossy and nonlinear materials to be employed, which greatly broadens one's choices for high-index materials. Moreover, we will see that there is the potential of greatly surpassing even the properties of silica fibers.

Absorption and nonlinearites correspond to tiny shifts in $\Delta\in$ in the dielectric constant of the materials, and can therefore be treated by perturbation theory. This common technique allows one to compute the shift $\Delta\beta$ due to a small perturbation, using only the unperturbed modes (computed earlier via the transfer matrices). For absorption losses (also possibly including Rayleigh scattering), $\Delta\in$ is a small imaginary part added to the dielectric constant $\in$ to represent the (material-dependent) dissipation rate. Using a first-order perturbation analysis, we calculate the losses of the $TE_{01}$, $TE_{02}$, and $EH_{11}$ modes in our 17-layer Bragg fiber example by assuming that the core is lossless, and that both the high and low-index cladding layers have the same material dissipation rate $\alpha_0$ (which may be expressed in dB/m). Furthermore, we divide the computed dissipation rate $\alpha$ by $\alpha_0$, yielding a dimensionless, material-loss independent absorption suppression coefficient of the respective mode. This was done for each frequency across the band gap, and the results are plotted in FIG. 8. As one can see, the cladding losses are suppressed by more than four orders of magnitude over most of the bandwidth for the $TE_{01}$, a result that one may anticipate based on the scaling law of Eq. 6. Furthermore, the losses for the $TE_{01}$, are substantially smaller than those for the other modes, producing a mode-filtering effect that allows single-mode-like operation.

We now consider Kerr nonlinearities in the Bragg fiber. Such nonlinearities cause the index n of the material to vary as a function of electric-field strength: $n' = n + n_2 |\vec{E}|^2$, where $n_2$ is the "nonlinear index coefficient" of the material(s). To first order, the resulting perturbation to the dielectric constant can be expressed as: $\Delta\epsilon = 2\ nn_2|\vec{E}|^2$.

Kerr nonlinearities cause several problems in fiber systems: self/cross-phase modulation (SPM/XPM), where the energy at one frequency shifts the $\beta$ at the same/another frequency; and also four-wave mixing (FWM), in which energy at one frequency leaks into another frequency. SPM and XPM interact with dispersion to limit dispersion-compensation schemes, and FWM causes noise/crosstalk between channels. Our concern here is not to compute these effects per se, but rather to define the limits in which they may be neglected.

Figure 10:
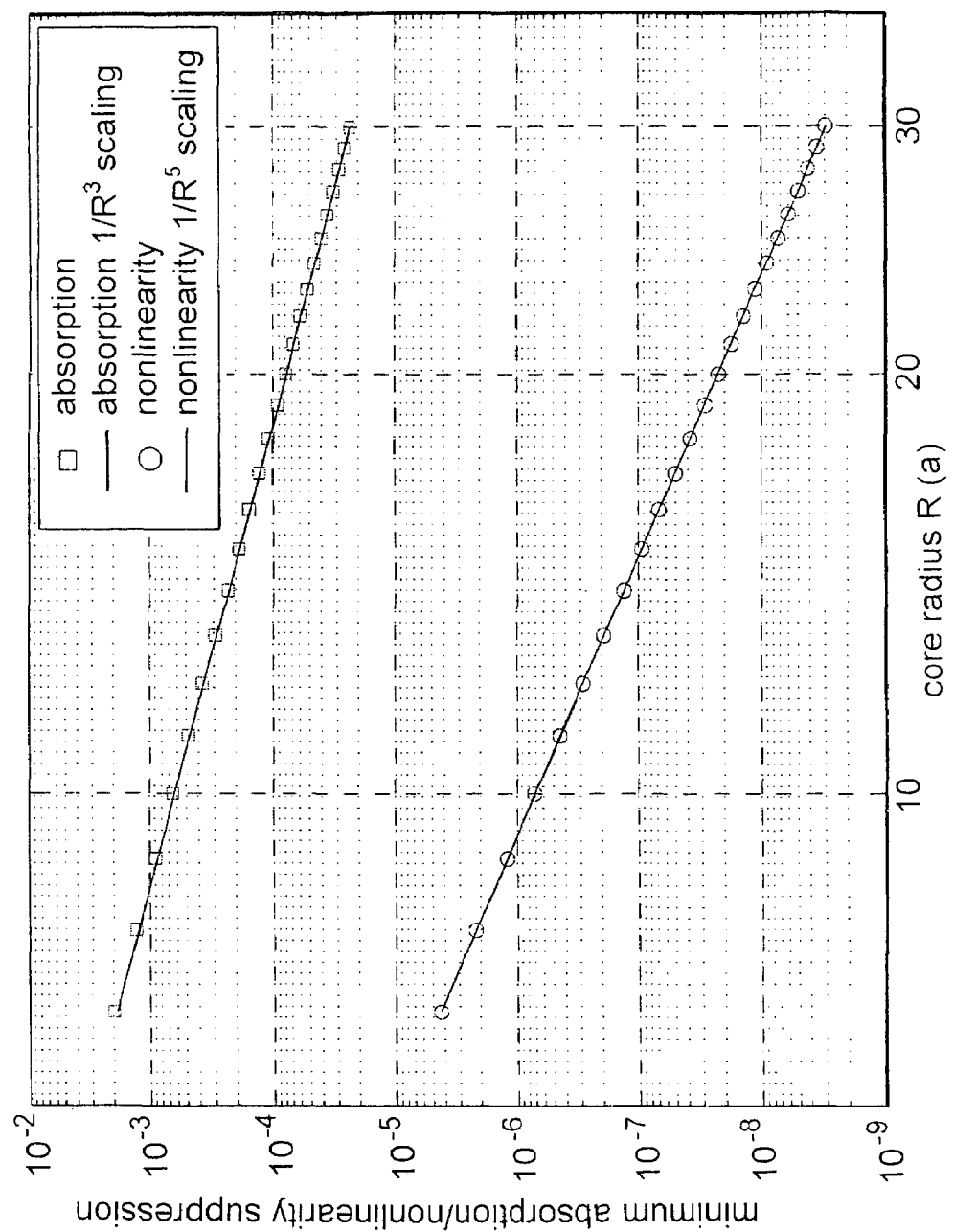
FIG. 10 is a graph showing the scaling properties of absorption and nonlinearities with respect to core radius in a Bragg fiber.

The strength of nonlinearities in a fiber is given by a nonlinear lengthscale $L_{NL}$, defined as the inverse of the SPM phase shift $\Delta\beta$; this is the lengthscale at which SPM and XPM become significant, and also appears as a scaling coefficient in the FWM noise. $L_{NL}$ is inversely proportional to the mode power P (to first order), so we can also define a nonlinear strength $\gamma \equiv 1/PL_{NL} = \Delta\beta/P$, which is a power independent quantity proportional to the strength of nonlinear effects in the waveguide. We use first-order perturbation theory to calculate $\gamma$ for the $TE_{01}$ mode of our 17-layer Bragg fiber across the bandgap, assuming that each cladding layer has the same value of $n_2$. We then divide those values $\gamma$ by $\gamma_0$, which is the computed value for $\gamma$ when we assume both the core and cladding have the $n_2$ nonlinearity. The resulting values provide a dimensionless nonlinearity suppression factor, which is plotted in FIG. 10. The results show that the cladding nonlinearities are suppressed by more than eight orders of magnitude over much of the bandwidth. Thus, the nonlinearities of the large core Bragg fiber will be dominated by the nonlinearities of air rather than those of the cladding, even for cladding materials thousands of times more nonlinear than silica. Because gases have Kerr constants almost 1000 times weaker than that of silica and the core area in our 17-layer fiber is almost 10 times larger than the effective area of a typical silica fiber, our Bragg fiber has nonlinearities that are almost 10,000 times weaker than those of conventional silica fibers.

Such low nonlinearities would open dramatically new areas for fiber operation: for example, high powers, closely-spaced channels and/or low/zero dispersion without regard for FWM. In particular, FWM noise is proportional to $\gamma^2/(\Delta\beta^2 + \alpha^2)$, so even when the channel spacing is made very small ($\Delta\beta$ approaching zero), small radiation/absorption losses $\alpha$ on the order 0.01 dB/km are still sufficient to minimize FWM when $\gamma$ is small as it is here.

Figure 8:
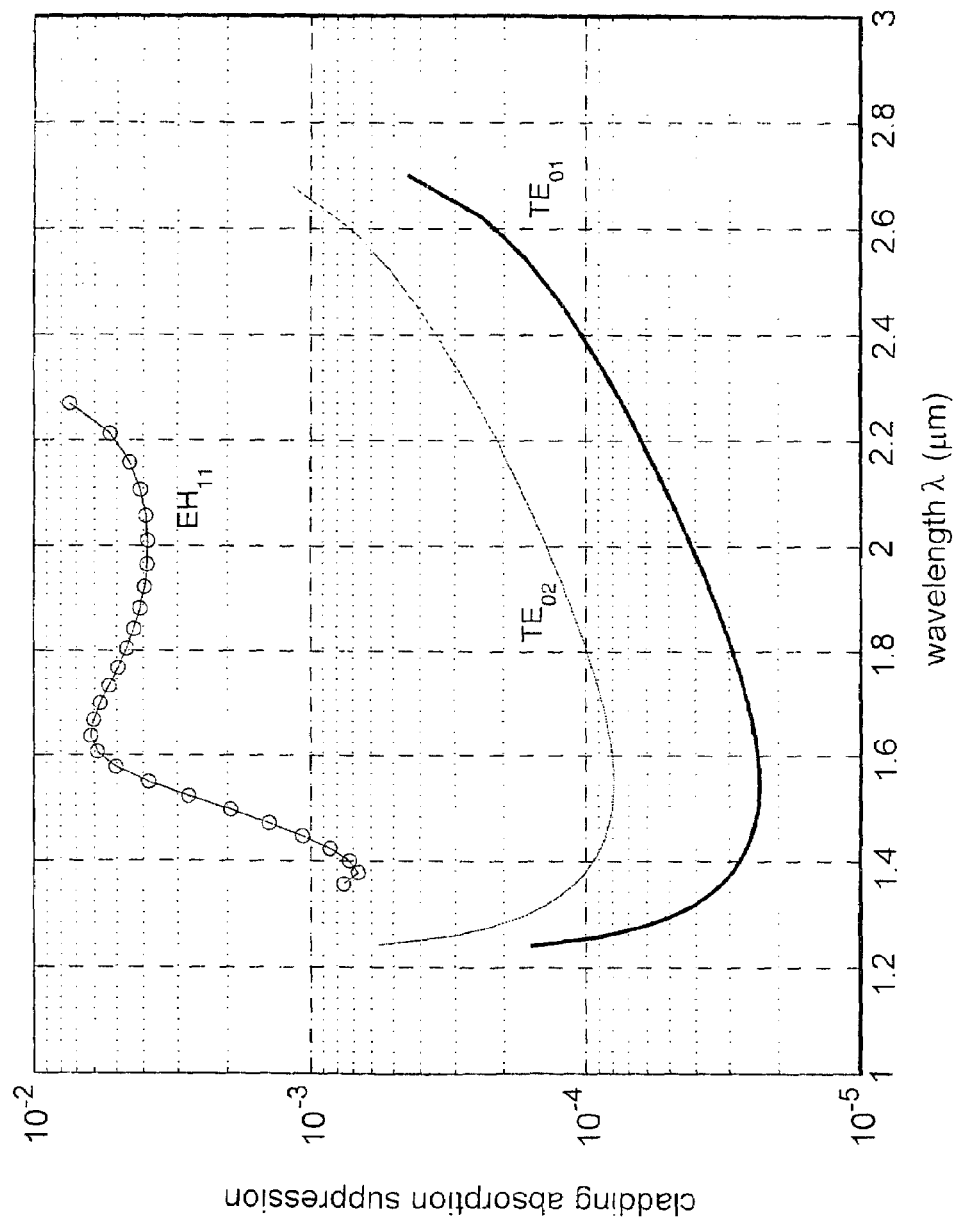
FIG. 8 is a graph of absorption losses from the cladding material for modes of the large core Bragg fiber.
Figure 9:
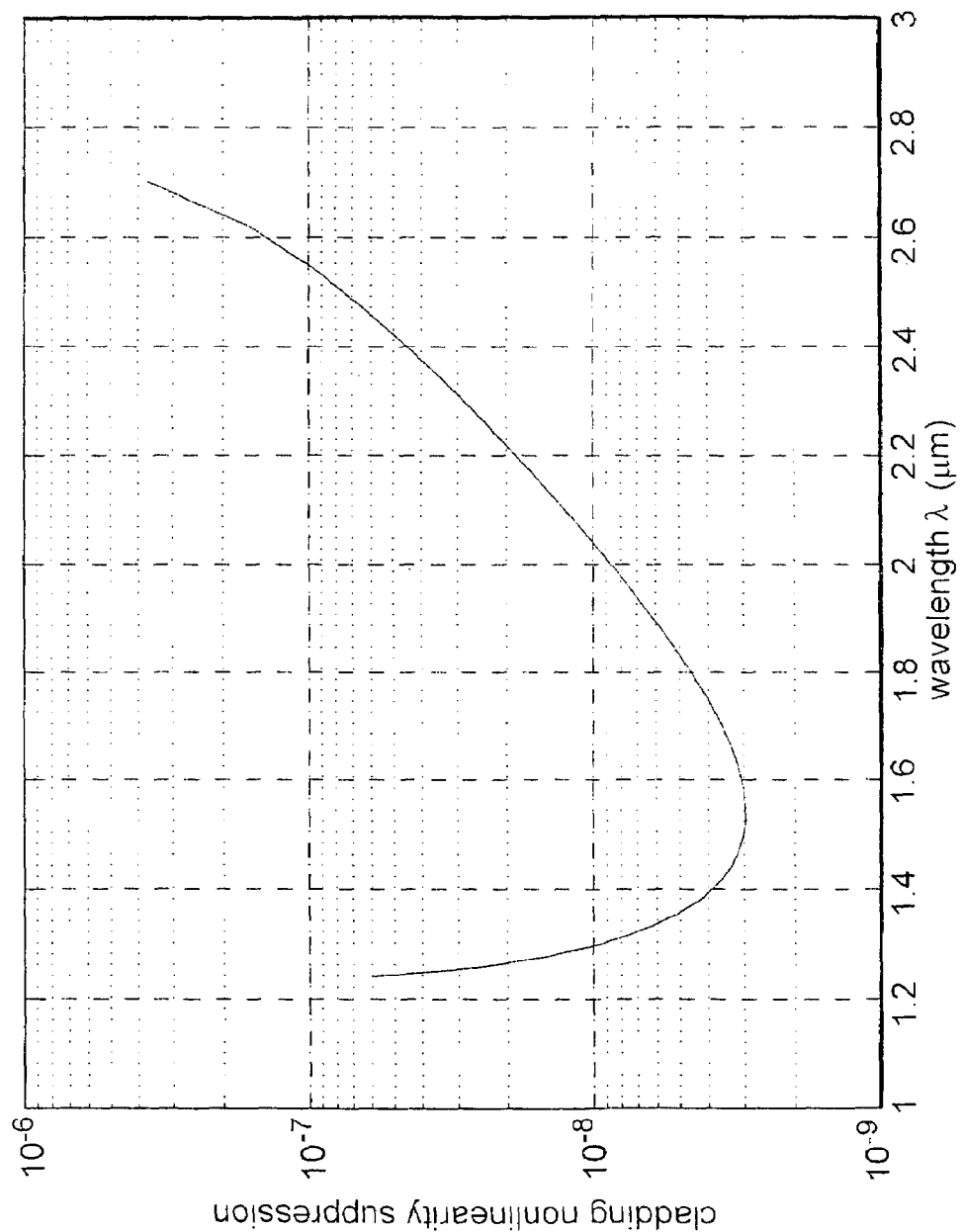
FIG. 9 is a graph of the cladding nonlinearity suppression for the $TE_{01}$ mode of the large core Bragg fiber.

The results of FIGS. 8 and 9 follow directly from scaling laws as a function of core radius R. In particular, the first-order perturbation result involves an integrand proportional to the fraction of $|\vec{E}|^2$ in the cladding, which scales as $1/R^3$ as seen in Eq. 6, and thus we have:

$$TE_{01}\ \text{cladding adsorption} \propto \frac{1}{R^3}. \quad (12)$$

This is a familiar result, since it is the same as the scaling as that of ohmic dissipation losses in a hollow metallic waveguide. The scaling for the nonlinear strength $\gamma$ is found by similar arguments. Here, however, there is an additional factor of $|\vec{E}|^2$ from the nonlinear perturbation itself, which corresponds to a $1/R^4$ scaling from Eq. 5. As a result, the nonlinear strength $\gamma$ scales as $1/R^7$. On the other hand, the nonlinear strength $\gamma_0$ when one adds nonlinearities scales inversely with the area $R^2$ as in an ordinary optical fiber, so:

$$TE_{01}\ \text{cladding nonlinearity}\ \frac{\gamma}{\gamma_0} \propto \frac{1}{R^5} \quad (13)$$

It is because of these rapid $1/R^3$ and $1/R^5$ scalings that the cladding absorption and nonlinearities can be suppressed so strongly for the $TE_{01}$ mode in a large-core Bragg fiber. To demonstrate these scaling laws explicitly, we plot the absorption and nonlinear suppression coefficients for the $TE_{01}$ mode as a function of R in FIG. 10, superimposing the predicted scaling laws. Hollow squares/circles show the computed values, and the solid lines display the values predicted by starting from the 30 a value and applying the scaling laws.

Scaling Laws with Index Contrast

Although many of the previous computations assumed an index contrast of 4.6/1.6, the same qualitative results hold for a wide range of indices as long as the confinement remains strong. The index contrast manifests itself in the decay rate of the field into the cladding, which determines the characteristic penetration depth $d_p$, and the analogy with the metallic waveguide remains valid when $d_p \ll R$. Below, we derive scaling relations to predict how Bragg fiber properties vary with the cladding indices (assuming $d_p \ll R$).

In particular, with each bilayer of cladding, the fields decrease by some attenuation factor $\kappa(\omega,\beta)$. For modes nearly on the light line, using "quarter-wave" bilayers according to Eq. 4, and defining $\tilde{n} = \sqrt{n^2 - 1}$, the mid-gap $\kappa$ for TE/TM fields is:

$$\kappa_{te} \cong \frac{\tilde{n}_{lo}}{\tilde{n}_{hi}} \quad (14)$$

$$\kappa_{tm} \cong \frac{n_{lo}^2 \tilde{n}_{lo}}{n_{hi}^2 \tilde{n}_{hi}} > \kappa_{te} \quad (15)$$

The penetration depth $d_p$ is then proportional to $\alpha/(1-\kappa^2)$. Using the earlier scaling law from Eq. 6 and defining $f_{hi} \equiv d_{hi}/a = \tilde{n}_{lo}(\tilde{n}_{lo} + \tilde{n}_{hi})$, we can further generalize Eq. 6 to give:

$$\text{fraction of } \int |\vec{E}|^2 \text{ in cladding for } TE_{01} \propto \frac{f_{hi}^2}{(1-\kappa_{te}^2)} \frac{a^3}{R^3} \quad (16)$$

Similarly, Eqs. 12 and 13 can be further generalized, where we also define $\bar{n} \equiv (n_{hi} - n_{lo}) f_{hi} + n_{lo}$:

$$TE_{01} \text{ cladding absorption} \propto \frac{\bar{n} f_{hi}^2}{(1-\kappa_{te}^2)} \frac{a^3}{R^3} \quad (17)$$

$$TE_{01} \text{ cladding nonlinearity } \frac{\gamma}{\gamma_0} \propto \frac{\bar{n} f_{hi}^4}{(1-\kappa_{te}^4)} \frac{a^5}{R^5} \quad (18)$$

The number of cladding layers required to achieve a given radiation leakage rate for TE or TM modes scales inversely with $\log(1/\kappa_{te})$ or $\log(1/\kappa_{tm})$, respectively. So, for example, if one used indices of 1.459/1.450, as may be common for doped silica layers, about 2000 cladding layers are required to achieve the same TE radiation-leakage rates as in FIG. 6.

The bandwidth also varies with index contrast. One is limited by the size of the TM gap along the light line, which for the quarter-wave stack of Eq. 4 is:

$$\frac{\Delta \omega_{TM}}{\omega_0} = \frac{4}{\pi} \sin^{-1}\left( \frac{n_{hi}^2 \bar{n}_{lo} - n_{lo}^2 \bar{n}_{hi}}{n_{hi}^2 \bar{n}_{lo} + n_{lo}^2 \bar{n}_{hi}} \right) \quad (19)$$

where $\omega_0$ is the mid-gap frequency:

$$\omega_0 = \frac{\bar{n}_{lo} + \bar{n}_{hi}}{4 \bar{n}_{lo} \bar{n}_{hi}} \cdot \frac{2\pi c}{a} \quad (20)$$

Telecommunication Systems

Figure 11:
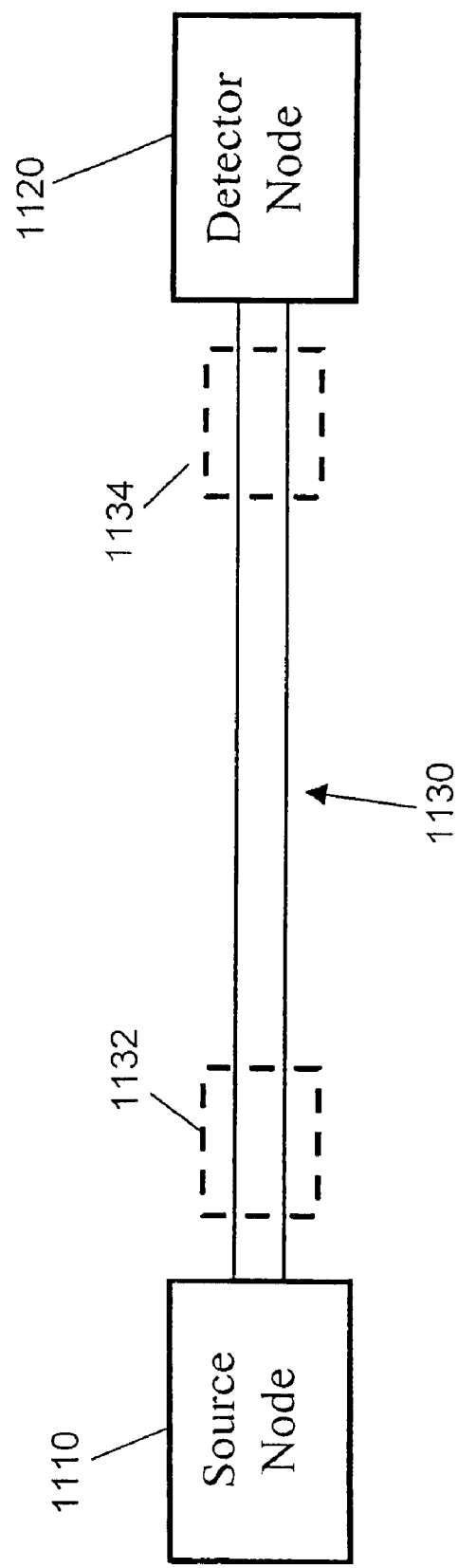
FIG. 11 is a schematic diagram of an optical telecommunication system that implements large core photonic crystal waveguide fibers described herein.

The photonic crystal waveguides described herein may be used in optical telecommunications systems. FIG. 11 shows a schematic diagram of an optical telecommunication system 1100 including a source node 1100 and a detection node 1120, which are coupled to one another by an optical transmission line 1130. The optical transmission line may include one or more segments of transmission fiber 1132 and one or more segments of dispersion compensation fiber 1134. Source node 1110 may be the original source of an optical signal directed along the transmission line or it may be an intermediate node that redirects the optical signal to transmission line 1130, optically amplifies it, and/or electronically detects it and optically regenerates it. Furthermore, source node 1110 may include components for multiplexing or demultiplexing multiple optical signals at different wavelengths. Similarly, detector node 1120 maybe the final destination for the optical signal transmitted along the transmission line, or it may be an intermediate node that redirects, optically amplifies, and/or electrically detects and optically regenerates the optical signal. In addition, detector node 1120 may also include components for multiplexing or demultiplexing multiple optical signals at different wavelengths. The dispersion compensation fiber(s) may be positioned to pre-compensate, post-compensate, or inline compensate for dispersion in the optical signal caused by the transmission fiber(s). Furthermore, the optical signal transmitted along the transmission line may be a WDM signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

Because of their small losses and nonlinearities, the large core photonic crystal fibers described herein may be used as the transmission fiber in system 1100. Because the losses are small, the lengths of the transmission line can be made larger as periodic amplification is less necessary. For example, the losses may be smaller than 1 dB/km, smaller than 0.1 dB/km, or even smaller than 0.01 dB/km. Moreover, because FWM is reduced, WDM channel spacing in the fiber can be made smaller. Furthermore, large amounts of dispersion may be compensated by dispersion compensating fiber 1134 because the nonlinear length scales are much smaller.

Coupling Issues

Finally, we briefly address coupling between the large core photonic crystal fibers described herein and adjacent fibers and/or optical systems connected at their respective ends. Generally, the coupling efficiency between respective modes of fibers connected to one another is proportional to the degree to which a mode in the first fiber overlaps spatially with a mode in the second fiber. In the photonic crystal fibers described herein, the lowest-loss mode is typically associated with the $TE_{01}$ mode. Accordingly, for applications where the photonic crystal fiber has a long length, operating with the $TE_{01}$ mode is preferable. The $TE_{01}$ mode has an azimuthal symmetry and has an electric field distribution that is maximized at a distance from the core center. On the other hands, index-guided silica fibers usually operate with the doubly degenerate $HE_{11}$ mode (which may correspond to, for example, linearly polarized light at the core center). Such a mode may not overlap well with the $TE_{01}$ mode, which has an azimuthal symmetry and has an electric field distribution that is maximized at a distance from the core center.

To facilitate coupling, either fiber may include a mode-coupling region to optimize coupling between a first mode in a first fiber and a second mode in a second fiber. For example, to couple an m=1 working mode from a photonic crystal fibers described herein to the $HE_{11}$ mode of silica optical fiber, the silica fiber may include a mode coupling region whose index cross-section changes with axial position to smoothly couple the working mode to the $HE_{11}$ mode. In one example, the coupling region may have a hollow ring-shaped cross-section that index-guides light within the ring cross-section and subsequently fills in along the axial direction to form a conventional optical fiber. The ring diameter and thickness would be selected to optimize coupling from the working mode, whose field distribution is maximized at some distance from the core center. In another example, the cross-section of the silica fiber in the coupling region could be doped with impurities to optimize coupling, e.g., the doping could form a ring-shaped pattern. The doping pattern would gradually be phased out over the axial extent of the coupling region. Furthermore, in other embodiments, it may be the photonic crystal fiber that includes the coupling region with some axial variation in refractive index cross-section.

A number of embodiments of the invention have been described. Nevertheless, it will be understood that various modifications may be made without departing from the spirit and scope of the invention. Accordingly, other embodiments are within the scope of the following claims.

What is claimed is:

1. An all-dielectric waveguide comprising:
a dielectric core region extending along a waveguide axis; and
a dielectric confinement region surrounding the core about the waveguide axis, the confinement region comprising alternating layers of at least two different dielectric materials surrounding the core about the waveguide axis, wherein during operation the confinement region guides EM radiation in at least a first range of frequencies to propagate along the waveguide axis in the core,
wherein the core has an average refractive index smaller than about 1.3 for a frequency in the first range of frequencies,
wherein the core has a diameter in a range between about $4\lambda$ and $80\lambda$, wherein $\lambda$ is a wavelength corresponding to a central frequency in the first frequency range, and
wherein the refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}}$$

where $d_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively.

2. The waveguide of claim 1, wherein the waveguide supports a mode in which at least 99% of the average energy of the propagating EM radiation is in the core for a frequency in the first range of frequencies.

3. The waveguide of claim 1, wherein the ratio of the bandwidth of the first range of frequencies and the central frequency is at least about 10%.

4. The waveguide of claim 1, wherein the confinement region guides at least one mode to propagate along the waveguide axis with radiative losses less than 1.0 dB/km for a frequency in the first range of frequencies.

5. The waveguide of claim 1, wherein the confinement region guides at least one mode to propagate along the waveguide axis with radiative losses less than 0.1 dB/km for a frequency in the first range of frequencies.

6. The waveguide of claim 1, wherein the core comprises a gas.

7. The waveguide of claim 1, wherein the first range of frequencies corresponds to wavelengths in the range of about 1.2 microns to 1.7 microns.

8. The waveguide of claim 1, wherein the first range of frequencies corresponds to wavelengths in the range of about 0.7 microns to 0.9 microns.

9. The waveguide of claim 1, wherein the ratio of the refractive index of the two different dielectric materials in the dielectric confinement region is greater than 1.5.

10. The waveguide of claim 1, wherein the dielectric confinement region is sufficient to cause EM radiation that is incident on the confinement region from the core in the first frequency range and with any polarization to have a reflectivity for a planar geometry that is greater than 95% for angles of incidence ranging from 0° to at least 80°.

11. The waveguide of claim 1, wherein a lower-index one of the different dielectric materials comprises a polymer or a glass.

12. The waveguide of claim 1, wherein a higher-index one of the dielectric material comprises germanium, tellurium, or a chalcogenide glass.

13. The waveguide of claim 1, wherein the diameter of the core is in the range of about $8\lambda$ and $80\lambda$.

14. The waveguide of claim 1, wherein the diameter of the core is in the range of about $4\lambda$ and $60\lambda$.

15. The waveguide of claim 1, wherein the diameter of the core is in the range of about $5\lambda$ and $60\lambda$.

16. The waveguide of claim 1, wherein the diameter of the core is in the range of about $6\lambda$ and $40\lambda$.

17. The waveguide of claim 1, wherein the diameter of the core is in the range of about $8\lambda$ and $40\lambda$.

18. An all-dielectric waveguide comprising:
a dielectric core region extending along a waveguide axis; and
a dielectric confinement region surrounding the core about the waveguide axis, the confinement region comprising alternating layers of at least two different dielectric materials surrounding the core about the waveguide axis and guiding EM radiation in at least a first range of frequencies to propagate along the waveguide axis in the core,
wherein the core has an average refractive index smaller than about 1.3 for a frequency in the first range of frequencies,
wherein the core has a diameter in a range between about 5 microns and 170 microns; and
wherein the refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}}$$

where $d_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively.

19. The waveguide of claim 18, wherein the core has a diameter in a range between about 10 microns and 170 microns.

20. The waveguide of claim 18, wherein the core has a diameter in a range between about 10 microns and 170 microns.

21. The waveguide of claim 20, wherein
during operation the confinement region guides EM radiation in at least a first range of frequencies to propagate along the waveguide axis in the core to have radiative losses less than 1.0 dB/km for a frequency in the first range of frequencies,
the core comprises a gas, and
a ratio of a refractive index of a high-index one of the two dielectric materials in the dielectric confinement region for a central frequency in the first frequency range to that of a low-index one of the two dielectric materials is greater than 1.5.

22. An all-dielectric waveguide comprising:
a dielectric core region extending along a waveguide axis; and a dielectric confinement region surrounding the core about the waveguide axis, the confinement region comprising alternating layers of at least two different dielectric materials surrounding the core about the waveguide axis, wherein during operation the confinement region guides EM radiation in at least a first range of frequencies to propagate along the waveguide axis in the core to have radiative losses less than 1.0 dB/km for a frequency in the first range of frequencies, wherein the core comprises a gas and has an average refractive index smaller than about 1.3 for a frequency in the first range of frequencies, wherein the core has a diameter in a range between about $4\lambda$ and $80\lambda$, wherein $\lambda$ is a wavelength corresponding to a central frequency in the first frequency range, wherein a ratio of a refractive index of a high-index one of the two dielectric materials in the dielectric confinement region for the central frequency to that of a low-index one of the two dielectric materials is greater than 1.5, and wherein the refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}}$$

where $d_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively.

* * * * *

UNITED STATES PATENT AND TRADEMARK OFFICE
CERTIFICATE OF CORRECTION

PATENT NO. : 7,072,553 B2
APPLICATION NO. : 10/620479
DATED : July 4, 2006
INVENTOR(S) : Steven G. Johnson et al.

It is certified that error appears in the above-identified patent and that said Letters Patent is hereby corrected as shown below:

Column 5
Line 49, replace "10λ" with --100λ--

Column 11
Line 53, replace "example" with --examples--

Column 14
Line 18, replace "expresses" with --expressed--
Line 27/28, replace "$\omega \approx 0.28 \cdot 2\pi c/a$" with -- $\omega \cong 0.28 \cdot 2\pi c/a$ --

Column 15
Line 36, replace "$(J_0(\xi)-J_2(\xi)(\xi/2R)$" with --$(J_0(\xi)-J_2(\xi))(\xi/2R)$--

Column 17
Line 39, replace "R=30 a" with --R=30a--

Column 20
Line 10, replace "adsorption" with --absorption--
Line 38, replace "30 a" with --30a--

Column 21
Line 58, replace "maybe" with --may be--

Column 22
Line 35, replace "hands" with --hand--

UNITED STATES PATENT AND TRADEMARK OFFICE
CERTIFICATE OF CORRECTION

PATENT NO.         : 7,072,553 B2
APPLICATION NO. : 10/620479
DATED                : July 4, 2006
INVENTOR(S)       : Steven G. Johnson et al.

It is certified that error appears in the above-identified patent and that said Letters Patent is hereby corrected as shown below:

<u>Column 24</u>
Line 48, replace "10 microns" with --7 microns--

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO.       : 7,072,553 B2                                     Page 1 of 1
APPLICATION NO.  : 10/620479
DATED            : July 4, 2006
INVENTOR(S)      : Steven G. Johnson et al.

It is certified that error appears in the above-identified patent and that said Letters Patent is hereby corrected as shown below:

<u>Cover Page</u>
Assignee, replace "OmniGuide Communications." with --OmniGuide, Inc.--
On the title page, item [56]: add
References Cited, U.S. Patent Documents, please add
    --4,139,262  2/1979  Mahlein et al.--
References Cited, Foreign Patent Documents, please add
    --DE  24 42 85  3/1976--
References Cited, Other Publications, please add
    --Malcolm G. Smith, "All-glass hollow waveguide with structured cladding", Optical Fiber Communications, OFC '96, pp. 58-59 (February 25, 1996--
References Cited, Other Publications, please add
    --A copy of a European Search Report for EP Application No. 02706036.7-2216/PCT/US0202482 dated February 3, 2006 by Examiner A. Frisch--

Signed and Sealed this

Twenty-ninth Day of April, 2008

JON W. DUDAS
*Director of the United States Patent and Trademark Office*